(12) United States Patent
Nako et al.

(10) Patent No.: US 9,289,859 B2
(45) Date of Patent: Mar. 22, 2016

(54) WELD METAL WITH EXCELLENT CREEP CHARACTERISTICS

(75) Inventors: Hidenori Nako, Kobe (JP); Ken Yamashita, Fujisawa (JP); Minoru Otsu, Fujisawa (JP); Mikihiro Sakata, Fujisawa (JP); Genichi Taniguchi, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 295 days.

(21) Appl. No.: 13/982,763

(22) PCT Filed: Feb. 9, 2012

(86) PCT No.: PCT/JP2012/053016
§ 371 (c)(1),
(2), (4) Date: Jul. 31, 2013

(87) PCT Pub. No.: WO2012/108517
PCT Pub. Date: Aug. 16, 2012

(65) Prior Publication Data
US 2013/0309003 A1 Nov. 21, 2013

(30) Foreign Application Priority Data
Feb. 9, 2011 (JP) .................................. 2011-026485

(51) Int. Cl.
*C22C 38/22* (2006.01)
*C22C 38/24* (2006.01)
*C22C 38/26* (2006.01)
(Continued)

(52) U.S. Cl.
CPC .............. *B23K 35/3086* (2013.01); *B23K 9/025* (2013.01); *B23K 9/035* (2013.01); *B23K 9/16* (2013.01); *B23K 9/18* (2013.01); *B23K 9/23* (2013.01); *B23K 35/308* (2013.01);
(Continued)

(58) Field of Classification Search
None
See application file for complete search history.

(56) References Cited

U.S. PATENT DOCUMENTS

| 5,430,269 A | 7/1995 | Natsume et al. |
| 2006/0179974 A1 | 8/2006 | Hatano et al. |

FOREIGN PATENT DOCUMENTS

| CN | 1821432 A | 8/2006 |
| CN | 101352790 A | 1/2009 |

(Continued)

OTHER PUBLICATIONS

Extended European Search Report issued on Feb. 10, 2015 in Application No. 12744389.3.

(Continued)

*Primary Examiner* — Deborah Yee
(74) *Attorney, Agent, or Firm* — Oblon, McClelland, Maier & Neustadt, L.L.P.

(57) ABSTRACT

This weld metal has excellent creep characteristics and has a given chemical composition. In the weld metal, the value A defined by equation (1) is 200 or greater, and carbide particles each having an equivalent-circle diameter of 0.40 μm or more have an average equivalent-circle diameter less than 0.85 μm. In the segments that connect the centers of three or more carbide particles which are present on a 6-μm straight line and which each has an equivalent-circle diameter of 0.40 μm or more, the sum of the lengths of the portions where the segments intersect the carbide particles is 25% or more of the overall length of the segments.

$$\text{Value } A = ([V]/51 + [Nb]/93) / \{[V] \times ([Cr]/5 + [Mo]/2)\} \times 10^4 \quad (1)$$

In the equation, [V], [Nb], [Cr], and [Mo] respectively indicate the contents (mass %) of V, Nb, Cr, and Mo in the weld metal.

5 Claims, 5 Drawing Sheets

CARBIDE PARTICLE (IN GRAY) HAVING EQUIVALENT-CIRCLE DIAMETER OF LESS THAN 0.40μm (<0.40μm)

CARBIDE PARTICLE (IN BLACK) HAVING EQUIVALENT-CIRCLE DIAMETER OF 0.40μm OR MORE (≥0.40μm)

(51) Int. Cl.
  *B23K 35/30*  (2006.01)
  *B23K 9/025*  (2006.01)
  *B23K 9/035*  (2006.01)
  *B23K 9/23*   (2006.01)
  *B23K 9/16*   (2006.01)
  *B23K 9/18*   (2006.01)

(52) U.S. Cl.
  CPC ............. *C22C 38/22* (2013.01); *C22C 38/24* (2013.01); *B23K 2203/04* (2013.01); *Y10T 403/478* (2015.01)

(56) References Cited

FOREIGN PATENT DOCUMENTS

| | | |
|---|---|---|
| EP | 1 693 143 A1 | 8/2006 |
| EP | 1 958 729 A1 | 8/2008 |
| FR | 2 740 715 A1 | 5/1997 |
| JP | 02 182378 | 7/1990 |
| JP | 6 328292 | 11/1994 |
| JP | 7 290275 | 11/1995 |
| JP | 8 150478 | 6/1996 |
| JP | 2000 301378 | 10/2000 |
| JP | 2002 18593 | 1/2002 |
| JP | 2004 230410 | 8/2004 |
| JP | 2006-225718 | 8/2006 |
| JP | 2009 106949 | 5/2009 |
| KR | 10-2006-0092146 | 8/2006 |

OTHER PUBLICATIONS

Written Opinion of the International Searching Authority Issued Apr. 24, 2012 in PCT/JP12/053016 Filed Feb. 9, 2012.

International Search Report Issued Apr. 24, 2012 in PCT/JP12/053016 Filed Feb. 9, 2012.

ENLARGE LINE B5

ALSO CALCULATE LENGTH Ci OF CARBIDE PARTICLE INTERSECTING ANOTHER LINE (UNITS:mm)

T:THICKNESS

T:THICKNESS

WELD METAL WITH EXCELLENT CREEP CHARACTERISTICS

CROSS REFERENCE TO RELATED APPLICATIONS

The present application is a 35 U.S.C. §371 national stage patent application of international patent application PCT/JP2012/053016, filed on Feb. 9, 2012, published as WO 2012/108517 on Aug. 16, 2012, the text of which is incorporated by reference, and claims the benefit of the filing dates of Japanese Patent Application No. 2011-026485, filed on Feb. 9, 2011, the text of which is also incorporated by reference.

TECHNICAL FIELD

The present invention relates to weld metal used for a weld structure, and more specifically, to a weld metal with improved creep characteristics, and a weld structure including the weld metal.

BACKGROUND ART

High-strength Cr—Mo steel for use in a boiler or chemical reactor is used under high-temperature and high-pressure atmosphere, and thus is required to have the high-level creep characteristics (hereinafter also referred to as a "creep-rupture resistance") in addition to the high strength and toughness. Particularly, in recent years, each equipment described above tends to be exposed under the higher-temperature and higher-pressure conditions for operation from the viewpoint of effective operation, and is increasingly required to have the improved creep characteristics.

Such conditions are also required of a weld metal formed in welding the high-strength Cr—Mo steel. The weld metal is also required to exhibit creep characteristics at high level in addition to the high-temperature resistance and toughness after stress relief (SR) annealing, and the high cracking resistance (SR cracking resistance) to SR annealing, which are important issues.

For this reason, various techniques for improving the high-temperature creep characteristics of the weld metal have been hitherto proposed.

For example, Patent Document 1 discloses that the weld with both the good creep-rupture resistance and other characteristics can be obtained by defining a steel composition, a weld material composition, and weld conditions in detail. In the technique, however, the supposed level of the creep-rupture resistance is 800 hours under about 240 MPa at 550° C., which is not sufficient. The SR annealing condition for one time is a maximum time of 26 hours, which is short (which is the condition that tends to make the creep-rupture resistance high). The SR annealing is performed twice, which disadvantageously needs complicated processes.

Another technique is proposed which achieves both the adequate creep-rupture resistance and various characteristics by taking into consideration the components of a solid wire and bonded flux, and welding conditions (the amount of input heat) (see, for example, Patent Documents 2 and 3). In these techniques, however, the supposed SR annealing conditions are 700° C. and 26 hours, and the holding time is very short, which does not mean that the good creep-rupture resistance is also surely obtained under a stricter SR annealing condition.

Patent Document 4 discloses a further technique that achieves both the adequate creep-rupture resistance and various characteristics by controlling the balance between components of a weld metal and main elements of a base metal. In the technique, however, the supposed level of the creep-rupture resistance is 900 hours under 538° C.×206 MPa, which is not sufficient. The above document fails to describe the holding time of the SR annealing. It is unclear whether the good creep-rupture characteristics can be achieved.

On the other hand, as a technique paying attention to characteristics other than the high-temperature creep characteristics, for example, there has been proposed such a technique as that disclosed in Patent Document 5. The technique improves the toughness and the resistance to temper brittleness by controlling the form of the carbide, but fails to describe the improvement of the creep-rupture characteristics.

CITATION LIST

Patent Document

Patent Document 1: Japanese Unexamined Patent Publication No. Hei 2 (1990)-182378
Patent Document 2: Japanese Unexamined Patent Publication No. Hei 6 (1994)-328292
Patent Document 3: Japanese Unexamined Patent Publication No. Hei 8 (1996)-150478
Patent Document 4: Japanese Unexamined Patent Publication No. 2000-301378
Patent Document 5: Japanese Unexamined Patent Publication No. 2009-106949

SUMMARY OF INVENTION

Technical Problem

The present invention has been made taking into consideration the above circumstances, and it is an object of the present invention to provide a weld metal exhibiting excellent creep characteristics with excellent other characteristics, including toughness, SR cracking resistance, strength and the like, and a weld structure including the weld metal.

Solution to Problem

A weld metal according to the present invention that can solve the above problems contains: C, 0.05 to 0.20% (in percentage by mass, also for the following chemical components), Si: 0.10 to 0.50%, Mn: 0.60 to 1.3%, Cr: 1.8 to 3.0%, Mo: 0.8 to 1.5%, V: 0.25 to 0.50%, Nb: 0.010 to 0.050%, N: 0.025% or less (not including 0%), O: 0.020 to 0.060%, and the remainder of iron and inevitable impurities. A value A defined by the following formula (1) is 200 or greater:

$$\text{Value } A = ([V]/51 + [Nb]/93)/\{[V] \times ([Cr]/5 + [Mo]/2)\} \times 10^4 \quad (1)$$

in which [V], [Nb], [Cr], and [Mo] respectively indicate the contents (mass %) of V, Nb, Cr, and Mo in the weld metal. Carbide particles respectively contained in the weld metal, and each having an equivalent-circle diameter of 0.40 μm or more, have an average equivalent-circle diameter less than 0.85 μm. In segments that connect centers of three or more carbide particles which are present on a 6-μm straight line and each of which has an equivalent-circle diameter of 0.4 μm or more, a sum of lengths of portions where the segments intersect the carbide particles is 25% or more of the overall length of the segments.

The term "equivalent-circle diameter" as used herein means a diameter of a circle with the same area as that of a carbide particle, taking into consideration the size of the carbide particle seen on an observation surface with a microscope (for example, transmission electron microscope). The term "average equivalent-circle diameter" as used herein is a value (arithmetic mean value) obtained by dividing the sum of the sizes (equivalent-circle diameters) of carbide particles each having an equivalent-circle diameter of 0.40 µm or more, by the number of the carbide particles.

The weld metal of the present invention further preferably contains, as another element, (a) Cu: 0.5% or less (not including 0%), and/or Ni: 0.5% or less (not including 0%), (b) W: 0.50% or less (not including 0%), (c) B: 0.005% or less (not including 0%), (d) Al: 0.030% or less (not including 0%), and (e) Ti: 0.020% or less (not including 0%), whereby the characteristics of the weld metal are further improved in accordance with the type of elements contained.

The present invention includes a weld structure with the weld metal described above.

Advantageous Effects of Invention

The present invention appropriately defines not only the chemical composition, but also the average equivalent-circle diameter of carbide particles, and the ratio of lengths of the portions occupied by the carbide particles in the grain boundaries existing in the weld metal. Thus, the present invention can achieve the weld metal exhibiting the excellent creep characteristics with excellent other characteristics, including toughness, SR cracking resistance, and strength.

DESCRIPTION OF EMBODIMENTS

Figure 1A:
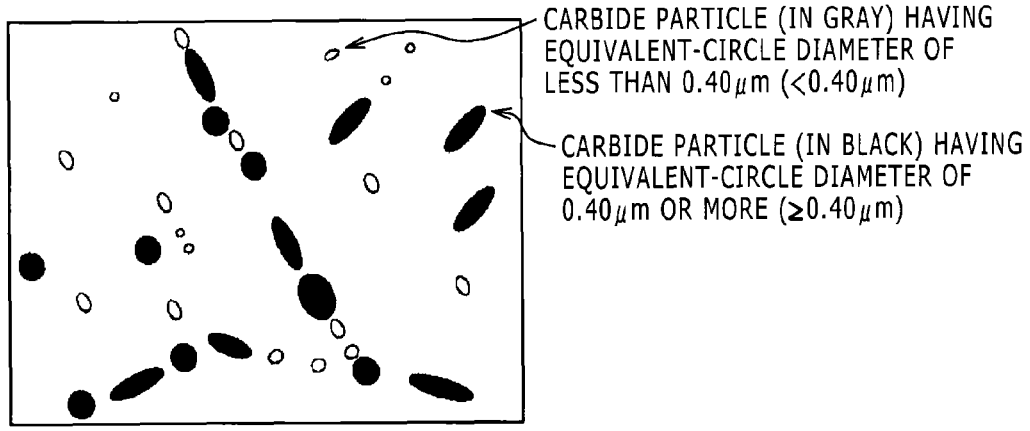
FIG. 1A is a first conceptual diagram for explaining a method of calculating a ratio of lengths of portions where carbide particles exist in a grain boundary.

The inventors have studied about means for achieving both the adequate creep-rupture resistance and various characteristics of a weld metal, especially, toughness, SR cracking resistance, and strength from various viewpoints. As a result, the inventors have found that a weld metal with the adequate creep-rupture characteristics and various characteristics described above can be obtained by controlling the form of carbides on grain boundaries of the weld metal formed in welding and SR annealing, and by suppressing Ostwald ripening of a fine MC carbide particle (M: carbide formation element) during a creep test. The present invention has been made based on the above findings.

That is, the inventors have found out the following. A composition of the weld metal is controlled within a predetermined range, the value A defined by the following equation (1) is 200 or greater, and carbide particles contained in the weld metal and each having an equivalent-circle diameter of 0.40 µm or more have an average equivalent-circle diameter suppressed to less than 0.85 µm. Additionally, the ratio of the lengths of the portions occupied by carbide particles in the grain boundaries existing in the weld metal to the overall length of the grain boundary is 25% or more. In this way, the weld metal can achieve both the adequate creep-rupture resistance and various characteristics described above.

$$\text{Value } A = ([V]/51 + [Nb]/93)/\{[V] \times ([Cr]/5 + [Mo]/2)\} \times 10^4 \tag{1}$$

in which [V], [Nb], [Cr], and [Mo] respectively indicate the contents (mass %) of V, Nb, Cr, and Mo in the weld metal.

The value A defined by the above equation (1) is a factor for controlling the number of MC carbide particles contributing to the improvement of the creep-rupture resistance. The MC carbide particles act as obstacles for dislocation migration during the creep rupture test to thereby improve the creep-rupture characteristics. This effect becomes more noticeable as the number of MC carbide particles increases. The number of MC carbide particles is decreased due to the Ostwald ripening during the creep rupture test. How to ensure the number of MC carbide particles during the creep rupture test is an important issue for improving the creep-rupture resistance.

The inventors have studied about techniques for ensuring the number of MC carbide particles during the creep rupture test. The study shows that the creep-rupture resistance can be improved by sufficiently ensuring the number of MC carbide particles prior to the creep-rupture test, and by suppressing the Ostwald ripening during the creep rupture test, that is, by suppressing the decrease in number of MC carbide particles. Further, from the viewpoint of ensuring the number of MC carbide particles and suppressing the decrease in number of the particles, the above value A is defined as a factor for controlling the number of MC carbide particles during the creep rupture test.

In order to improve the creep-rupture resistance, it is necessary to suppress the grain boundary slip in the creep rupture test, in addition to ensuring the number of MC carbide particles and suppressing the decrease in number of the carbide particles during the creep rupture test by control of the value A. Thus, the inventors have studied measures for suppressing the grain boundary slip, and found that the carbide particles precipitating in the grain boundary act as a resistance against the grain boundary slip. The ratio of lengths of the portions occupied by the carbide particles in the grain boundaries is set to 25% or greater of the overall length of the grain boundary, which is found to further improve the creep-rupture resistance. The term "grain boundary" as used herein includes not only a ferrite grain boundary, but also a high angle grain boundary (that is, a grain boundary in which a difference between crystal orientations of the adjacent grain boundaries is more than 15°), such as a prior austenite grain boundary, a block boundary, or a packet boundary.

In the invention, the chemical composition of the weld metal is appropriately controlled, which is also an important factor. The reason for setting the content of each component will be given below.

[C: 0.05 to 0.20%]

The element C is an element useful for forming carbides. For the C content of less than 0.05%, the ratio of lengths of the portions occupied by the carbide particles in the grain boundaries existing in the weld metal is less than 25%. However, for the excessive C content, the carbide particles coarsen, which causes the reduction in toughness of the weld metal. Thus, the C content is set to 0.20% or less. The lower limit of a C content is preferably 0.07%, and more preferably, 0.09% or more. The upper limit of a C content is preferably 0.15%, and more preferably 0.13% or less.

[Si: 0.10 to 0.50%]

The element Si is an element useful for improving the weldability. For the Si content of less than 0.10%, the weldability is degraded. The excessive Si content, however, increases the drastic increase in strength of the weld metal, or the increase in amount of hard microstructures, such as martensite, which leads to a decrease in toughness of the weld metal. Thus, the Si content should be equal to or less than 0.50%. The lower limit of a Si content is preferably 0.15%, and more preferably 0.17% or more. The upper limit of Si content is preferably 0.40%, and more preferably 0.32% or less.

[Mn: 0.60 to 1.3%]

The element Mn is an element useful for ensuring the strength of the weld metal. For the Mn content of less than 0.60%, the strength of the weld metal at room temperature is decreased, which adversely affects the SR cracking resistance. The excessive Mn content, however, decreases the high-temperature strength of the weld metal. Thus, the Mn content needs to be 1.3% or less. The lower limit of a Mn content is preferably 0.8%, and more preferably 1.0% or more. The upper limit of a Mn content is preferably 1.2%, and more preferably 1.15% or less.

[Cr: 1.8 to 3.0%]

The element Cr is an element useful for forming carbides (mainly including $M_{23}C_6$ carbide). For the Cr content of less than 1.8%, a ratio of lengths of the portions occupied by carbide particles in the grain boundaries existing in the weld metal becomes less than 25%. The excessive Cr content, however, causes the carbides to coarsen, which reduces the toughness of the weld metal. Thus, the Cr content needs to be 3.0% or less. The lower limit of a Cr content is preferably 1.9%, and more preferably 2.0% or more. The upper limit of a Cr content is preferably 2.8%, and more preferably 2.6% or less.

[Mo: 0.8 to 1.5%]

The element Mo is an element useful for forming carbides (mainly including $M_6C$ carbide). For the Mo content of less than 0.8%, the ratio of lengths of the portions occupied by carbide particles in the grain boundaries existing in the weld metal becomes less than 25%. The excessive Mo content, however, causes the carbides to coarsen, which reduces the toughness of the weld metal. Thus, the Mo content needs to be 1.5% or less. The lower limit of a Mo content is preferably 0.9%, and more preferably 0.95% or more. The upper limit of a Mo content is preferably 1.2%, and more preferably 1.1% or less.

[V: 0.25 to 0.50%]

The element V is an element useful for forming carbide (MC carbides) to improve the creep-rupture characteristics. For the V content of less than 0.25%, the creep-rupture characteristics are degraded. The excessive V content, however, drastically increases the strength of the weld metal to reduce the toughness thereof. Thus, the V content needs to be 0.50% or less. The lower limit of a V content is preferably 0.27%, and more preferably 0.30% or more. The upper limit of a V content is preferably 0.45%, and more preferably 0.40% or less.

[Nb: 0.010 to 0.050%]

The element Nb is an element useful for forming carbides (MC carbides) to improve the creep-rupture characteristics. For the Nb content of less than 0.010%, the creep-rupture characteristics are degraded. The excessive Nb content, however, leads to a drastic increase in strength of the weld metal to reduce the toughness thereof. Thus, the Nb content needs to be 0.050% or less. The lower limit of a Nb content is preferably 0.012%, and more preferably 0.015% or more. The upper limit of a Nb content is preferably 0.040%, and more preferably 0.035% or less.

[N: 0.025% or less (not including 0%)]

The element N is contained in the MC carbides to thereby increase the number of fine particles of the MC carbides, which contributes to improvement of the creep-rupture characteristics. The excessive N content, however, causes the MC carbides to coarsen, which adversely affects the creep-rupture characteristics. Thus, the N content needs to be 0.025% or less. In order to exhibit the above effects, the lower limit of an N content is preferably 0.005% (more preferably, 0.008% or more), and the upper limit of an N content is preferably 0.020% (more preferably, 0.015% or less).

[O: 0.020 to 0.060%]

The element O is an element useful for forming oxides to contribute to structural refinement of the weld metal composition, thereby improving the toughness of the weld metal. In order to exhibit such an effect, the content O needs to be 0.020% or more. The excessive O content of more than 0.060%, however, increases the coarse oxides, which act as a starting point of brittle fracture to thereby decrease the toughness of the weld metal. The lower limit of an O content is preferably 0.025% (more preferably, 0.028% or more), and the upper limit of an O content is preferably 0.050% (more preferably, 0.045% or less).

The components of the weld metal defined by the invention are described above, and the remainder or balance includes iron and inevitable impurities. The inevitable impurities include elements (for example, P, S and the like) that are allowed to be trapped in the weld metal depending on conditions, including raw materials, resources, and manufacturing equipment.

The weld metal of the invention further preferably contains, as other elements, (a) Cu: 0.5% or less (not including 0%), and/or Ni: 0.5% or less (not including 0%), (b) W: 0.50% or less (not including 0%), (c) B: 0.005% or less (not including 0%), (d) Al: 0.030% or less (not including 0%), (e) Ti: 0.020% or less (not including 0%), and the like, so that the characteristics of the weld metal are further improved according to the type of the element contained. The reasons for setting the contents of the above elements are as follows.

[Cu: 0.5% or less (not including 0%) and/or Ni: 0.5% or less (not including 0%)]

The elements Cu and Ni are elements useful for improving the toughness of the weld metal by the structural refinement. The excessive content of these elements, however, might make the composition much finer to reduce the creep-rupture characteristics. Thus, each of the Cu content and Ni content is preferably 0.5% or less, more preferably 0.4% or less, and most preferably 0.3% or less. In order to exhibit the above effect, the lower limit of each of the Cu and Ni contents is preferably 0.02% or more (more preferably 0.03% or more).

[W: 0.50% or less (not including 0%)]

The element W is an element that forms carbides to contribute to the improvement of the creep-rupture characteristics of the weld metal. The excessive W content, however, causes the carbides formed in the grain boundary to coarsen, which adversely affects the toughness of the weld metal. Thus, the W content is preferably 0.50% or less, more preferably 0.3% or less (most preferably, 0.2% or less). In order to exhibit the above effect, the lower limit of a W content is preferably 0.08% or more (more preferably, 0.1% or more).

[B: 0.005% or less (not including 0%)]

The element B is an element that can be contained in $M_{23}C_6$, which is a carbide easily formed in the grain boundary, to make the particles of the carbides finer, thus optimizing the lengths of portions occupied by the carbides in the grain boundaries existing in the weld metal to contribute to the improvement of the creep-rupture resistance. The excessive B content, however, reduces the SR cracking resistance. Thus, the B content is preferably 0.005% or less, more preferably 0.004% or less (most preferably, 0.0025% or less). In order to exhibit the above effect, the lower limit of a B content is preferably 0.0005% or more (more preferably, 0.0010% or more).

[Al: 0.030% or less (not including 0%)]

The element Al is an element useful as a deoxidizing agent. The excessive Al content, however, causes oxides to coarsen, which adversely affects the toughness of the weld metal. Thus, the Al content is preferably 0.030% or less, more preferably, 0.020% or less (most preferably, 0.015% or less). In order to exhibit the above effect, the lower limit of an Al content is preferably 0.01% or more (more preferably, 0.012% or more).

[Ti: 0.020% or less (not including 0%)]

The element Ti is an element that forms MC carbides to contribute to the improvement of the creep-rupture characteristics of the weld metal. The excessive Ti content, however, promotes the precipitation of the MC carbides to drastically increase the intragranular strength, thereby reducing the SR cracking resistance of the weld metal. Thus, the element Ti content is preferably 0.020% or less, and more preferably 0.015% or less (most preferably, 0.012% or less). In order to exhibit the above effect, the lower limit of a Ti content is preferably 0.005% or more (more preferably, 0.008% or more).

In the weld metal of the invention, the value A defined by the above equation (1) needs to be 200 or more. The reason for setting the range of the value A is as follows. The value A is a factor for controlling the number of MC carbide particles during the creep rupture test. For the value A of less than 200, the number of MC carbides is decreased prior to the creep rupture test, or as the Ostwald ripening of the MC carbide particles progresses during the creep rupture test, so that the decrease in number of MC carbide particles is promoted to reduce the creep-rupture resistance. Thus, the value A is preferably 205 or more, more preferably 210 or more, and most preferably 215 or more. The excessive value A makes the particles of the MC carbides generated in the SR annealing much finer in more amount, which adversely affects the SR cracking resistance of the weld metal. Thus, the value A is preferably 250 or less.

In the weld metal of the invention, the carbide particles, each having an equivalent-circle diameter of 0.40 μm or more, need to have an average equivalent-circle diameter of less than 0.85 μm. When the average equivalent-circle diameter of the carbide particles is equal to or more than 0.85 μm, the coarsening carbides assist in progress of a crack, which degrades the toughness of the weld metal. The average equivalent-circle diameter is preferably less than 0.80 μm, more preferably less than 0.75 μm, and most preferably less than 0.70 μm. The coarsening carbide adversely affecting the toughness is composed of mainly $M_{23}C_6$ carbide, and $M_6C$ carbide. The fine particles (about 0.1 μm or less) of MC carbides relatively less affect the toughness of the weld metal. Particularly, by paying attention to the $M_{23}C_6$ carbide and the $M_6C$ carbide, the toughness of the weld metal is controlled. Thus, the size of the carbide of interest (equivalent-circle diameter) is set to 0.40 μm or more.

In the weld metal of the invention, in the segments that connect the centers of three or more carbide particles which are present on a 6-μm straight line and each of which has an equivalent-circle diameter of 0.4 μm or more, the sum of the lengths of the portions where the segments intersect the carbide particles needs to be 25% or more of the overall length of the segments. For the ratio of less than 25%, the effect of suppressing grain boundary sliding during the creep rupture test becomes insufficient, which reduces the creep-rupture resistance. The ratio is preferably 30% or more, more preferably 40% or more. The method of calculating the ratio of the lengths of the portions occupied by the carbide particles will be described below with reference to FIG. 1.

Figure 1B:
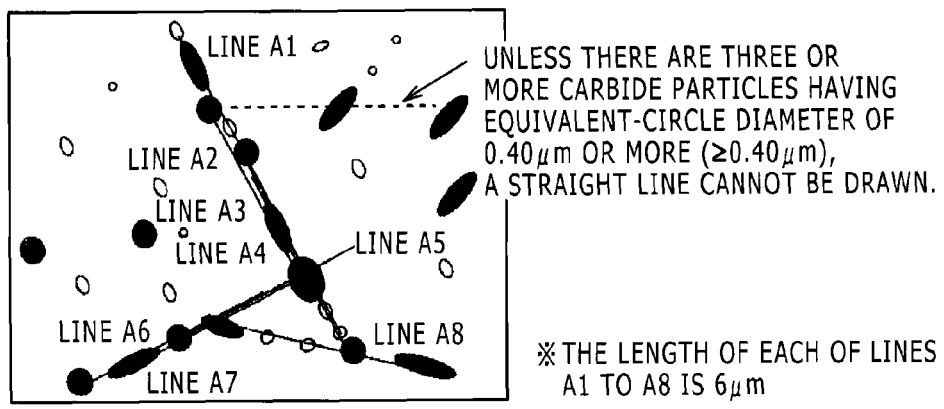
FIG. 1B is a second conceptual diagram for explaining a method of calculating a ratio of lengths of portions where carbide particles exist in a grain boundary.

Specimens for replica TEM (transmission electron microscope) observation are sampled, and straight lines Ai (i=1, 2, 3, ... n, n: total number of the straight lines) of 6 μm in length that intersect at least three carbide particles (indicated by parts colored in black) having an equivalent-circle diameter of 0.4 μm or more are selected (see FIGS. 1A and 1B: first and second conceptual diagrams). At this time, when the number of carbide particles having the equivalent-circle diameter of 0.4 μm or more and intersecting the straight line is less than three, the straight line cannot be drawn. FIG. 1B shows that eight straight lines (A1 to A8) are drawn. The length of each of the straight lines A1 to A8 is 6 μm.

Figure 1C:
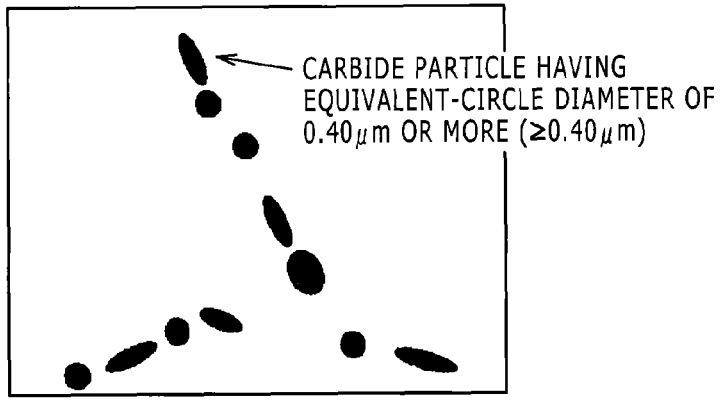
FIG. 1C is a third conceptual diagram for explaining a method of calculating a ratio of lengths of portions where carbide particles exist in a grain boundary.

Next, the carbide particles having the equivalent-circle diameter of 0.40 μm or more and intersecting the above straight line Ai are selected (see FIG. 1C: third conceptual diagram). The centers of circumscribed rectangles (oblong, square) of the adjacent carbide particles on the straight line Ai are connected together by a straight line Bi (i=1, 2, 3, ... m, m: the total number of straight lines) (see FIG. 1D: fourth conceptual diagram). A length Ci (i=1, 2, 3, ... k) of a portion of each straight line Bi superimposed on the carbide particle is calculated (see FIG. 1E: fifth conceptual diagram). The "(total sums of lengths C1 to Ck)/(total sums of lengths B1 to Bm)×100" is defined as the ratio of the lengths of the portions occupied by the carbide particles in the grain boundaries existing in the weld metal with respect to the overall length of the grain boundaries.

A welding method for obtaining the weld metal in the invention is any arc welding method, and not limited to the specific one. However, a submerged arc welding (SAW) or shielded metal arc welding (SMAW), which is often used for actually welding a chemical reactor and the like, is preferably applied as the welding method.

In order to achieve the weld metal of the invention, it is necessary to appropriately control the welding material and welding conditions. The components of the welding material are restricted by essential components of the weld metal. Further, the welding conditions and welding material components have to be appropriately controlled so as to obtain a predetermined form of the carbide.

For example, the preferable welding conditions in SAW are as follows: the amount of welding heat input of 2.5 to 5.0 kJ/mm, and a preheating/interpass temperature in welding of about 190 to 250° C. In order to obtain the predetermined weld metal, under the above welding conditions, the ratio of the Mn content [Mn] to the Cr content [Cr] in the welding wire ([Mn]/[Cr]) has only to be 0.48 or more while the Si content of the welding wire is set to 0.11% or more.

When the Si content of the welding wire is less than 0.11%, or when the above ratio ([Mn]/[Cr]) is less than 0.48, a deoxidation effect of Si or Mn is reduced, so that parts of Cr are fixed as an oxide, which reduces the amount of Cr contributing to formation of the carbide. As a result, the ratio of the lengths of the portions occupied by the carbide particles in the grain boundaries existing in the weld metal is less than 25%. The Si content of the welding wire is preferably 0.15% or more, and more preferably, 0.20% or more. The above ratio ([Mn]/[Cr]) is preferably 0.50 or more, and more preferably, 0.55 or more. When the ratio ([Mn]/[Cr]) becomes maximum, the Mn content and the Cr content of the weld metal due to variations in process during construction might not satisfy the predetermined range. Thus, the ratio ([Mn]/[Cr]) is preferably 0.72 or less.

When the amount of heat input in SAW is less than 2.5 kJ/mm, or when the preheating/interpass temperature is less than 190° C., the cooling speed in the welding is increased, which makes the grain size of the weld metal finer, so that the ratio of the lengths of the portions occupied by the carbide particles in the grain boundaries existing in the weld metal is less than 25%. When the amount of heat input in SAW exceeds 5.0 kJ/mm, or when the preheating/interpass temperature exceeds 250° C., the grains of the weld metal composition are coarsened, and the number of the grain boundaries as the formation site of carbides is decreased. As a result, the grain size of each carbide particle becomes larger to increase the number of the coarsening carbides, which cannot ensure the toughness of the weld metal.

The preferable welding conditions in the SMAW are as follows: the amount of heat input in welding of 2.3 to 3.0 kJ/mm, and the preheating/interpass temperature in welding of about 190 to 250° C. In order to obtain the predetermined weld metal under the above welding conditions, when manufacturing a welding rod, the ratio of the Mn content [Mn] to the Cr content [Cr] in the coating agent ([Mn]/[Cr]) should be 1.2 or more with the content ($Si+SiO_2$) of a coating agent being set to 5.0% or more.

When the content ($Si+SiO_2$) of the coating agent is set to less than 5.0%, or when the ratio ([Mn]/[Cr]) is less than 1.2, a deoxidation effect of Si or Mn is reduced, so that parts of Cr are fixed as an oxide, which reduces the amount of Cr contributing to formation of the carbide. As a result, the ratio of the lengths of the portions occupied by the carbide particles in the grain boundaries existing in the weld metal is less than 25%. The content ($Si+SiO_2$) of the coating agent is preferably 5.5% or more, and more preferably 6.0% or more. The above ratio ([Mn]/[Cr]) is preferably 1.5 or more, and more preferably 2.0 or more.

When the amount of heat input in SMAW is less than 2.3 kJ/mm, or when the preheating/interpass temperature is less than 190° C., the cooling speed in the welding is increased, which makes the grain size of the weld metal finer, so that the ratio of the lengths of the portions occupied by the carbide particles in the grain boundaries existing in the weld metal becomes less than 25%. When the amount of heat input exceeds 3.0 kJ/mm, or when the preheating/interpass temperature exceeds 250° C., the grains of the weld metal composition are coarsened, and the area of the grain boundaries as the formation site of carbides is decreased. As a result, the grain size of each carbide particle becomes larger to increase the number of the coarsening carbides, which cannot ensure the toughness of the weld metal.

The weld metal is formed under the above conditions, so that the thus-obtained weld metal exhibits the excellent creep characteristics as well as excellent other characteristics, including toughness, SR cracking resistance, and strength. Further, a weld structure including such a weld metal can be achieved.

EXAMPLES

Now, the invention will be described in detail with reference to examples. However, it is apparent that the invention is not limited to the following examples, and that various modifications and changes can be made to the invention within the scope of invention described above and later, any of which belongs to the technical range of the invention.

A base metal containing components below was used to manufacture the weld metal under the welding conditions describe later, and various characteristics of the weld metal were evaluated.

[Base Metal Composition (% by mass)]
  C: 0.12%, Si: 0.23%, Mn: 0.48%, P: 0.004%, S: 0.005%, Cu: 0.04%, Al: <0.002%, Ni: 0.08%, Cr: 2.25%, Mo: 0.99%, V: 0.004%, Ti: 0.002%, Nb: 0.005% (remainder: iron and inevitable impurities)

[Welding Conditions (SAW)]
  Welding Method: Submerge Arc Welding (SAW)
  Base Metal Thickness: 25 mm
  Groove Angle: 10° (V shape)
  Route Distance 25 mm
  Welding Position: flat
  Wire diameter: 4.0 mmϕ (wire composition is indicated by the following tables 1 and 2)
  Heat Input Conditions (AC-AC tandem)
    I) 2.4 kJ/mm (L: 440A-25V/T: 480A-27V, 10 mm/sec)
    II) 2.6 kJ/mm (L: 480A-25V/T: 500A-28V, 10 mm/sec)
    III) 3.7 kJ/mm (L: 580A-30V/T: 600A-32V, 10 mm/sec)
    IV) 4.8 kJ/mm (L: 440A-25V/T: 480A-27V, 5 mm/sec)
    V) 5.2 kJ/mm (L: 480A-25V/T: 500A-28V, 5 mm/sec)
      L: Leading wire (leading electrode)
      T: trailing wire (trailing electrode)
      Preheating/interpass temperature: 180-260° C.
      Deposition Method: 2 passes per layer (6 layers in total)
(Used Flux Composition)
  Composition A (% by mass) $SiO_2$: 6%, $Al_2O_3$: 18%, $M_gO$: 35%, $CaF_2$: 20%, CaO: 11%, Others ($CO_2$, Ca, $AlF_3$ and the like): 10%
  Composition B (% by mass) $SiO_2$: 8%, $Al_2O_3$: 14%, $M_gO$: 31%, $CaF_2$: 27%, CaO: 10%, Others ($CO_2$, Ca, $AlF_3$ and the like): 10%

[Welding Conditions (SMAW)]
  Welding Method: Shielded Metal Arc Welding (SMAW)
  Base Metal Thickness: 20 mm
  Groove Angle: 20° (V shape)
  Route Distance: 19 mm
  Welding Position: flat
  Core Wire Diameter: 5.0 mmϕ (Compositions of coating agents are shown in Table 7.)
  Heat Input Conditions
    VI) 2.1 kJ/mm (L: 210A-27V, 2.7 mm/sec)
    VII) 2.3 kJ/mm (L: 215A-27V, 2.5 mm/sec)
    VIII) 2.7 kJ/mm (L: 215A-27V, 2.2 mm/sec)
    IX) 3.0 kJ/mm (L: 220A-27V, 2.0 mm/sec)
    X) 3.2 kJ/mm (L: 225A-28V, 2.0 mm/sec)
    Preheating/interpass temperature: 180-260° C.
    Deposition Method: 2 passes per layer (8 layers in total)

(Used Composition of Core Wire for Welding Rod)

Composition a (% by mass) C: 0.09%, Si: 0.15%, Mn: 0.49%, Cu: 0.04%, Ni: 0.03%, Cr: 2.31%, Mo: 1.10% (Remainder: iron and inevitable impurities)

Composition b (% by mass) C: 0.05%, Si: 0.2%, Mn: 0.45%, Cu: 0.04%, Ni: 0.02%, Cr: 1.39%, Mo: 0.55% (Remainder: iron and inevitable impurities)

[Characteristics for Evaluation]

(Average Equivalent-Circle Diameter of Carbide Particles, Each Having Equivalent-Circle Diameter of 0.40 μm or more: Less Than 0.85 μm)

After SR annealing at 705° for 32 hours, the weld metal had its center in the final pass sampled as a specimen for replica TEM observation. Then, four images of each specimen were taken with a field of view of 13.3×15.7 μm by a factor of 7500. By use of an image analysis software ([Image-Pro Plus] manufactured by Media cybernetics), carbide particles each having an equivalent-circle diameter of 0.40 μm or more were selected, and then the average equivalent-circle diameter (which is a value obtained by dividing the total sums of the equivalent-circle diameters of the carbide particles by the number of carbide particles) of the carbide particles was calculated.

(Ratio of Lengths of Portions Occupied by Carbide Particles in Grain Boundaries Existing in Weld Metal: 25% or more)

After SR annealing at 705° for 32 hours, the weld metal had its center in the final pass sampled as a specimen for replica TEM observation. Then, four images of each specimen were taken with a field of view of 13.3×15.7 μm by a factor of 7500. By use of an image analysis software ([Image-Pro Plus] manufactured by Media cybernetics), the form of the carbide particle was analyzed in the following way.

(1) Straight lines Ai (i=1, 2, 3, ... n, n: the total number of straight lines) having a length of 6 μm and intersecting at least three carbide particles, each having an equivalent-circle diameter of 0.40 μm or more, were selected (see FIGS. 1A and 1B).

(2) The carbide particles each intersecting the straight line Ai and having an equivalent-circle diameter of 0.40 μm or more were selected (see FIG. 1C).

Figure 1D:
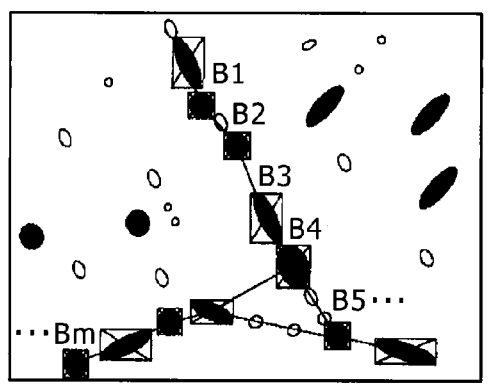
FIG. 1D is a fourth conceptual diagram for explaining a method of calculating a ratio of lengths of portions where carbide particles exist in a grain boundary.
Figure 1E:
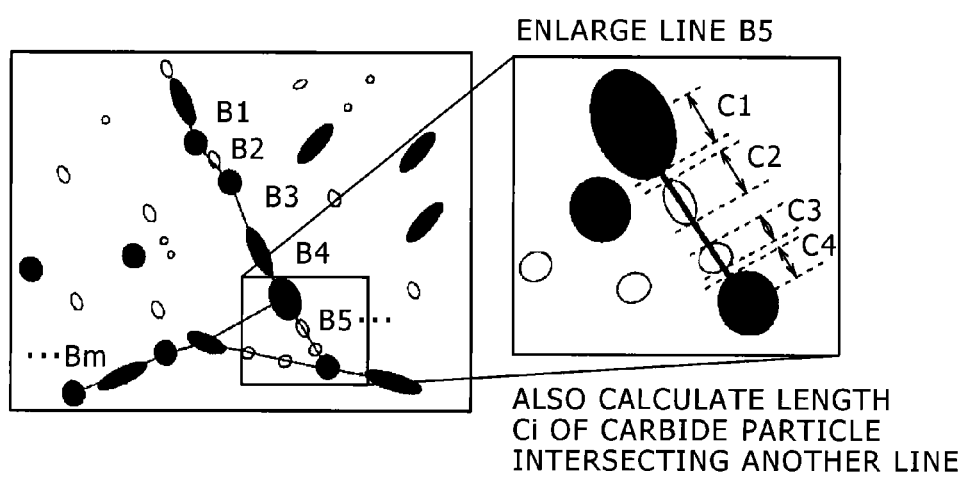
FIG. 1E is a fifth conceptual diagram for explaining a method of calculating a ratio of lengths of portions where carbide particles exist in a grain boundary.

(3) The centers of circumscribed rectangles of the adjacent carbide particles on the straight line Ai were connected together by a straight line Bi (i=1, 2, 3, ... m, m: the total number of straight lines) (see FIG. 1D). A length Ci (i=1, 2, 3, ... k) of the carbide particle intersecting the straight line Bi was calculated (see FIG. 1E). The "(total sums of lengths C1 to Ck)/(total sums of lengths B1 to Bm)×100" is regarded as the ratio (grain-boundary carbide ratio) of the lengths of the portions occupied by the carbide particles in the grain boundaries existing in the weld metal.

(High-Temperature Strength)

Figure 2:
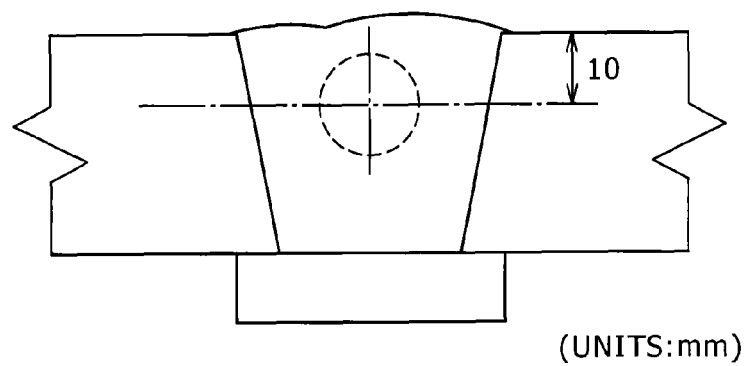
FIG. 2 is a schematic explanatory diagram showing the position in which a specimen for a tensile test is sampled.

A specimen for a tensile stress test (JIS Z3111 A2) was sampled from the position at a depth 10 mm from the surface in the thickness direction of each weld metal subjected to the SR annealing at 705° C. for 32 hours in the direction of a weld line based on FIG. 2. A tensile strength TS of each specimen was measured at 540° C. according to JIS Z 2241. The specimen having a tensile strength TS of greater than 400 MPa, that is, Ts>400 MPa was determined to have the excellent strength (high-temperature strength).

(Toughness)

Figure 3:
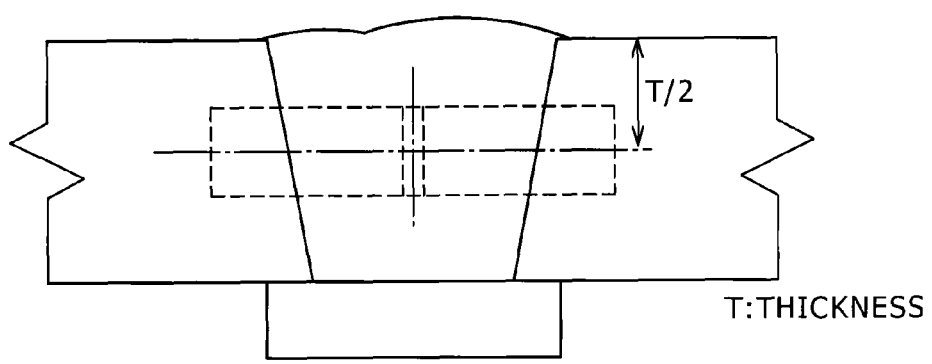
FIG. 3 is a schematic explanatory diagram showing the position in which a specimen for a Charpy impact test is sampled.

After the SR annealing at 705° C. for 8 hours, a specimen for a Charpy test (JIS Z31114 V notch specimen) was sampled from the center in the thickness direction of each weld metal in the direction perpendicular to the weld line direction based on FIG. 3. An absorbed energy $vE_{-30}$ of each specimen at −30° C. was measured according to JIS Z 2242. When an average value of the three times measurements exceeds 54 J, the specimen was determined to have the excellent toughness.

(SR Cracking Resistance)

A specimen for the ring cracking test with a slit size of 0.5 mm was sampled from the part in the final pass (as welded zone) of each weld metal in the following way. Then, 6 specimens (3 observation surfaces×2 tests) were subjected to the SR annealing at 625° C. for 10 hours. When no crack was generated in the vicinity of the bottom of a notch, the specimen was determined to have the excellent SR cracking resistance (evaluation o). When a crack was generated, the specimen was determined to have the inferior SR cracking resistance (evaluation x).

Figure 4A:
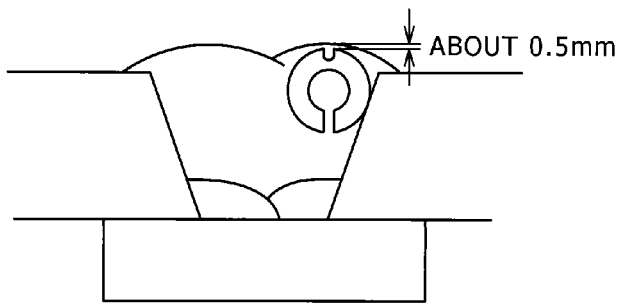
FIG. 4A is a schematic explanatory diagram showing the position in which a specimen for a SR cracking resistance test is sampled.
Figure 4B:
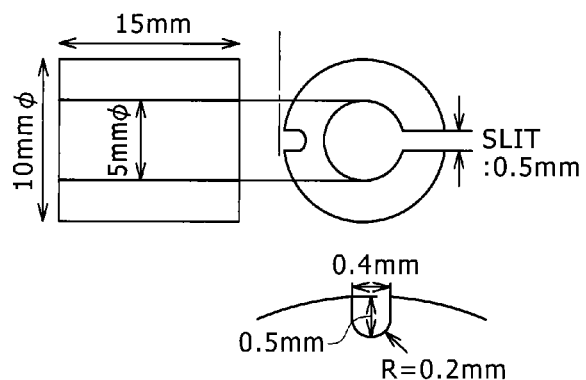
FIG. 4B is a schematic explanatory diagram showing the shape of the specimen for the SR cracking resistance test.
Figure 4C:
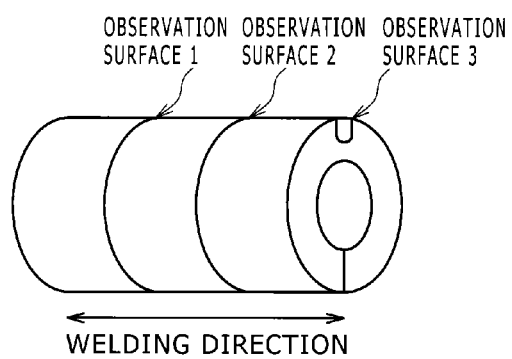
FIG. 4C is a schematic explanatory diagram showing a method of sampling the specimen for the SR cracking resistance test.

At this time, the outline of the ring cracking test as the evaluation method of the SR cracking resistance will be described below. FIG. 4A shows the position where the specimen is sampled. FIG. 4B shows the shape of the specimen. Specifically, the specimen was sampled with a slit size (width) of 0.5 mm from directly under the surface of the last bead such that the microstructure directly under the U notch acts as the as welded zone. The specimen was pressed until the slit width was 0.05 mm, and the part with the slit was welded by the TIG welding. Then, a tensile residual stress was applied to the bottom of the notch. The specimen after the TIG welding was subjected to the SR annealing at 625° C. for 10 hours in a muffle furnace. Then, after the SR annealing, the specimen was separated into three equal pieces (observation surfaces 1 to 3), whose cross-sections (near the bottom of the notch) were observed with an optical microscope. In this way, as shown in FIG. 4C, each specimen was checked if SR cracking was generated or not.

(Creep-Rupture Resistance)

Figure 5:
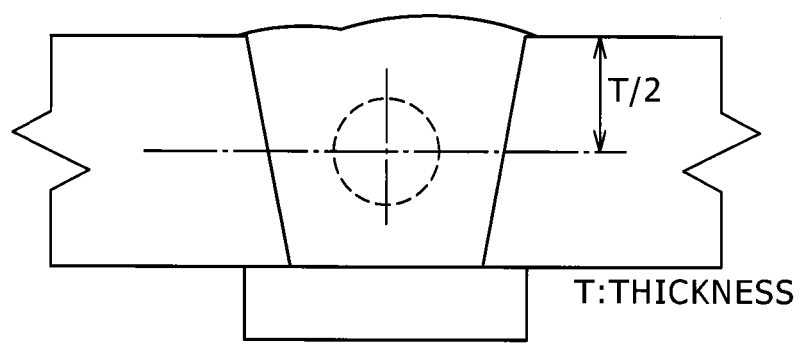
FIG. 5 is a schematic explanatory diagram showing the position in which a specimen for a creep-rupture test is sampled.

A specimen for the creep test with a gauge distance of 30 mm and a diameter of 6.0 mmϕ was sampled from the center in the thickness direction of each weld metal subjected to the SR annealing at 705° C. for 32 hours, in the direction of the weld line shown in FIG. 5. The specimen was subjected to the creep test under 210 MPa at 540° C. Then, a rupture time was measured. When the rupture time exceeded 1000 hours, the specimen was determined to have the excellent creep-rupture resistance.

Example 1

Chemical compositions of various welding wires (W1 to 47) used upon forming weld metals by the SAW are shown in the following Tables 1 and 2, together with the ratio ([Mn]/[Cr]). And, chemical compositions of the weld metals formed are shown in the following Tables 3 and 4, together with welding conditions (welding wire Number No., heat input conditions, flux for use, and preheating/interpass temperature) and the value A. Further, the results of evaluation of the characteristics of the respective weld metals (average equivalent-circle diameter of carbide particles, ratio of the carbide particles in the grain boundaries, tensile strength TS, toughness ($vE_{-30}$), SR cracking resistance, and creep-rupture resistance) are shown in the following Tables 5 and 6.

TABLE 1

| Welding wire No. | Chemical composition of welding wire * (% by mass) | | | | | | | | | | | | | | | [Mn]/[Cr] |
|---|---|---|---|---|---|---|---|---|---|---|---|---|---|---|---|---|
| | C | Si | Mn | Cr | Mo | V | Nb | N | O | Cu | Ni | W | Al | Ti | B | |
| W1 | 0.135 | 0.20 | 1.2 | 2.1 | 1.0 | 0.38 | 0.023 | 0.005 | 0.015 | — | — | — | — | — | — | 0.57 |
| W2 | 0.135 | 0.20 | 1.2 | 2.1 | 1.0 | 0.39 | 0.023 | 0.006 | 0.015 | — | — | — | — | — | — | 0.58 |
| W3 | 0.135 | 0.24 | 1.3 | 2.0 | 1.0 | 0.41 | 0.023 | 0.005 | 0.015 | — | — | 0.10 | — | — | — | 0.63 |
| W4 | 0.135 | 0.20 | 1.2 | 2.3 | 1.1 | 0.38 | 0.022 | 0.006 | 0.015 | 0.12 | — | — | — | — | — | 0.52 |
| W5 | 0.090 | 0.14 | 1.2 | 2.5 | 1.1 | 0.42 | 0.025 | 0.006 | 0.015 | 0.11 | — | — | — | — | — | 0.48 |
| W6 | 0.195 | 0.20 | 1.3 | 2.5 | 1.1 | 0.39 | 0.02 | 0.007 | 0.015 | 0.12 | — | — | — | — | — | 0.50 |
| W7 | 0.095 | 0.42 | 1.2 | 2.5 | 1.0 | 0.39 | 0.018 | 0.006 | 0.016 | 0.12 | — | 0.53 | — | — | — | 0.50 |
| W8 | 0.130 | 0.61 | 1.2 | 2.1 | 1.1 | 0.39 | 0.024 | 0.006 | 0.016 | 0.12 | — | — | — | 0.025 | — | 0.56 |
| W9 | 0.135 | 0.20 | 0.9 | 1.9 | 1.0 | 0.40 | 0.021 | 0.005 | 0.015 | 0.11 | — | — | — | — | — | 0.49 |
| W10 | 0.135 | 0.25 | 1.4 | 2.1 | 1.0 | 0.40 | 0.022 | 0.005 | 0.015 | 0.11 | — | — | — | — | — | 0.69 |
| W11 | 0.130 | 0.21 | 1.5 | 3.0 | 0.9 | 0.36 | 0.022 | 0.005 | 0.015 | 0.12 | — | — | — | — | — | 0.49 |
| W12 | 0.135 | 0.31 | 1.2 | 2.0 | 1.4 | 0.38 | 0.039 | 0.006 | 0.015 | 0.12 | — | — | — | — | 0.0010 | 0.59 |
| W13 | 0.095 | 0.25 | 1.3 | 2.4 | 1.0 | 0.50 | 0.016 | 0.006 | 0.015 | 0.12 | — | — | — | — | 0.0015 | 0.56 |
| W14 | 0.145 | 0.23 | 1.2 | 2.4 | 1.0 | 0.40 | 0.022 | 0.006 | 0.016 | 0.08 | — | 0.18 | — | — | 0.0012 | 0.51 |
| W15 | 0.135 | 0.21 | 1.3 | 2.6 | 1.0 | 0.30 | 0.024 | 0.005 | 0.015 | 0.12 | — | — | — | — | 0.0020 | 0.49 |
| W16 | 0.105 | 0.23 | 1.3 | 2.5 | 1.0 | 0.40 | 0.060 | 0.006 | 0.016 | 0.12 | — | — | — | — | — | 0.51 |
| W17 | 0.095 | 0.21 | 1.3 | 2.6 | 1.0 | 0.40 | 0.015 | 0.006 | 0.015 | 0.11 | — | 0.05 | — | — | — | 0.49 |
| W18 | 0.095 | 0.21 | 1.2 | 2.4 | 1.0 | 0.40 | 0.018 | 0.028 | 0.015 | 0.16 | — | 0.11 | — | — | — | 0.48 |
| W19 | 0.105 | 0.21 | 1.3 | 2.5 | 1.0 | 0.42 | 0.022 | 0.006 | 0.025 | 0.12 | — | — | — | — | — | 0.53 |
| W20 | 0.095 | 0.23 | 1.3 | 2.6 | 0.9 | 0.40 | 0.019 | 0.006 | 0.016 | 0.12 | — | 0.31 | — | — | — | 0.49 |
| W21 | 0.120 | 0.21 | 1.2 | 2.1 | 1.0 | 0.37 | 0.024 | 0.005 | 0.015 | 0.12 | — | — | — | 0.045 | — | 0.55 |
| W22 | 0.095 | 0.21 | 1.3 | 2.4 | 1.1 | 0.40 | 0.019 | 0.006 | 0.016 | 0.12 | 0.2 | — | — | — | — | 0.52 |
| W23 | 0.135 | 0.21 | 1.2 | 2.1 | 1.0 | 0.39 | 0.023 | 0.006 | 0.015 | 0.28 | — | — | — | — | — | 0.57 |
| W24 | 0.135 | 0.20 | 1.2 | 2.1 | 1.0 | 0.38 | 0.024 | 0.007 | 0.015 | 0.6 | — | — | — | — | — | 0.58 |

* Remainder: iron and inevitable impurities

TABLE 2

| Welding wire No. | Chemical composition of welding wire * (% by mass) | | | | | | | | |
|---|---|---|---|---|---|---|---|---|---|
| | C | Si | Mn | Cr | Mo | V | Nb | N | O |
| W25 | 0.095 | 0.19 | 1.3 | 2.4 | 1.1 | 0.39 | 0.024 | 0.006 | 0.017 |
| W26 | 0.095 | 0.24 | 1.4 | 2.4 | 1.0 | 0.40 | 0.017 | 0.006 | 0.016 |
| W27 | 0.095 | 0.25 | 1.4 | 2.4 | 1.0 | 0.40 | 0.017 | 0.006 | 0.016 |
| W28 | 0.135 | 0.20 | 1.2 | 2.1 | 1.0 | 0.39 | 0.021 | 0.006 | 0.015 |
| W29 | 0.135 | 0.20 | 1.2 | 2.1 | 1.1 | 0.38 | 0.022 | 0.006 | 0.016 |
| W30 | 0.155 | 0.21 | 1.0 | 2.1 | 1.1 | 0.45 | 0.018 | 0.005 | 0.016 |
| W31 | 0.095 | 0.26 | 1.3 | 2.5 | 1.1 | 0.40 | 0.020 | 0.006 | 0.015 |
| W32 | 0.095 | 0.26 | 1.3 | 2.5 | 1.1 | 0.40 | 0.020 | 0.006 | 0.015 |
| W33 | 0.310 | 0.24 | 1.2 | 2.5 | 1.0 | 0.39 | 0.019 | 0.006 | 0.015 |
| W34 | 0.095 | 0.24 | 1.2 | 3.2 | 0.9 | 0.29 | 0.019 | 0.006 | 0.016 |
| W35 | 0.095 | 0.25 | 1.3 | 2.6 | 1.1 | 0.39 | 0.021 | 0.006 | 0.015 |
| W36 | 0.090 | 0.21 | 1.2 | 2.5 | 1.1 | 0.42 | 0.025 | 0.006 | 0.015 |
| W37 | 0.130 | 0.10 | 1.3 | 2.1 | 1.6 | 0.38 | 0.023 | 0.006 | 0.015 |
| W38 | 0.135 | 0.19 | 0.6 | 1.8 | 1.0 | 0.39 | 0.021 | 0.006 | 0.015 |
| W39 | 0.150 | 0.88 | 1.2 | 2.6 | 1.0 | 0.39 | 0.012 | 0.005 | 0.015 |
| W40 | 0.135 | 0.20 | 1.5 | 2.1 | 1.0 | 0.39 | 0.024 | 0.006 | 0.015 |
| W41 | 0.095 | 0.20 | 1.1 | 2.1 | 0.7 | 0.39 | 0.023 | 0.006 | 0.080 |
| W42 | 0.140 | 0.22 | 1.2 | 2.4 | 1.0 | 0.25 | 0.025 | 0.005 | 0.015 |
| W43 | 0.140 | 0.22 | 1.2 | 2.4 | 1.0 | 0.60 | 0.025 | 0.005 | 0.015 |
| W44 | 0.135 | 0.20 | 1.2 | 2.1 | 1.0 | 0.38 | 0.065 | 0.006 | 0.015 |
| W45 | 0.095 | 0.21 | 1.2 | 2.1 | 1.1 | 0.40 | 0.018 | 0.032 | 0.015 |
| W46 | 0.135 | 0.20 | 1.2 | 2.2 | 1.0 | 0.37 | 0.023 | 0.006 | 0.015 |
| W47 | 0.135 | 0.20 | 1.2 | 2.1 | 1.0 | 0.38 | 0.024 | 0.007 | 0.015 |

| Welding wire No. | Chemical composition of welding wire * (% by mass) | | | | | | [Mn]/[Cr] |
|---|---|---|---|---|---|---|---|
| | Cu | Ni | W | Al | Ti | B | |
| W25 | 0.12 | 0.5 | — | — | — | — | 0.54 |
| W26 | 0.12 | — | — | 0.03 | — | 0.0024 | 0.58 |
| W27 | 0.12 | — | — | 0.05 | — | — | 0.59 |
| W28 | 0.12 | — | — | — | — | 0.003 | 0.57 |
| W29 | 0.12 | — | — | — | — | 0.006 | 0.57 |
| W30 | 0.12 | — | 0.17 | — | — | — | 0.49 |
| W31 | 0.12 | — | — | — | — | — | 0.52 |
| W32 | 0.12 | — | — | — | — | — | 0.52 |
| W33 | 0.11 | — | 0.21 | — | — | — | 0.49 |

TABLE 2-continued

| | | | | | | | |
|---|---|---|---|---|---|---|---|
| W34 | 0.11 | — | 0.21 | — | — | — | 0.38 |
| W35 | 0.12 | — | — | — | — | — | 0.49 |
| W36 | 0.11 | — | — | — | — | — | 0.48 |
| W37 | 0.11 | — | — | — | — | — | 0.60 |
| W38 | 0.11 | — | — | — | — | — | 0.3 |
| W39 | 0.12 | — | — | — | — | — | 0.46 |
| W40 | 0.11 | — | 0.65 | — | — | — | 0.69 |
| W41 | — | — | — | — | — | — | 0.53 |
| W42 | 0.12 | — | — | — | — | — | 0.51 |
| W43 | 0.12 | — | — | — | — | — | 0.51 |
| W44 | 0.12 | — | — | — | — | — | 0.56 |
| W45 | 0.12 | — | 0.11 | — | 0.055 | — | 0.56 |
| W46 | 0.65 | — | — | — | — | 0.006 | 0.55 |
| W47 | 0.12 | 0.6 | — | 0.07 | — | — | 0.58 |

* Remainder: iron and inevitable impurities

TABLE 3

| Specimen No. | Welding wire No. | Heat input conditions | Flux for use | Preheating/interpass temperature (°C.) | Chemical composition of weld metal ** (% by mass) | | | | | | | | | |
|---|---|---|---|---|---|---|---|---|---|---|---|---|---|---|
| | | | | | C. | Si | Mn | Cr | Mo | V | Nb | N | | |
| 1 | W1 | III | A | 200 | 0.11 | 0.16 | 1.05 | 2.11 | 1.0 | 0.32 | 0.012 | 0.006 | | |
| 2 | W2 | III | B | 200 | 0.12 | 0.14 | 1.03 | 2.05 | 1.0 | 0.32 | 0.013 | 0.006 | | |
| 3 | W3 | III | A | 200 | 0.09 | 0.18 | 1.13 | 2.02 | 1.0 | 0.33 | 0.015 | 0.006 | | |
| 4 | W4 | III | B | 200 | 0.12 | 0.15 | 1.05 | 2.21 | 1.0 | 0.33 | 0.012 | 0.006 | | |
| 5 | W5 | III | A | 190 | 0.06 | 0.11 | 1.05 | 2.41 | 1.0 | 0.36 | 0.016 | 0.006 | | |
| 6 | W6 | III | A | 200 | 0.16 | 0.16 | 1.03 | 2.42 | 1.0 | 0.33 | 0.015 | 0.006 | | |
| 7 | W7 | III | A | 200 | 0.08 | 0.35 | 0.88 | 2.35 | 0.9 | 0.34 | 0.015 | 0.006 | | |
| 8 | W8 | III | A | 210 | 0.09 | 0.42 | 0.97 | 2.13 | 1.0 | 0.34 | 0.013 | 0.006 | | |
| 9 | W9 | III | A | 210 | 0.12 | 0.17 | 1.00 | 1.82 | 1.0 | 0.32 | 0.013 | 0.006 | | |
| 10 | W10 | III | A | 220 | 0.10 | 0.17 | 0.71 | 1.98 | 1.0 | 0.34 | 0.016 | 0.006 | | |
| 11 | W11 | III | A | 220 | 0.09 | 0.15 | 1.25 | 2.89 | 0.8 | 0.33 | 0.013 | 0.005 | | |
| 12 | W12 | III | B | 220 | 0.11 | 0.25 | 1.28 | 1.92 | 1.3 | 0.31 | 0.034 | 0.006 | | |
| 13 | W13 | III | A | 210 | 0.07 | 0.19 | 1.06 | 2.24 | 1.0 | 0.46 | 0.013 | 0.006 | | |
| 14 | W14 | III | A | 200 | 0.10 | 0.16 | 1.05 | 2.19 | 1.0 | 0.33 | 0.016 | 0.006 | | |
| 15 | W15 | III | B | 210 | 0.12 | 0.16 | 1.05 | 2.43 | 1.0 | 0.26 | 0.015 | 0.006 | | |
| 16 | W16 | III | A | 210 | 0.07 | 0.18 | 1.12 | 2.40 | 1.0 | 0.33 | 0.045 | 0.006 | | |
| 17 | W17 | III | A | 210 | 0.06 | 0.18 | 1.13 | 2.41 | 1.0 | 0.34 | 0.011 | 0.006 | | |
| 18 | W18 | III | A | 210 | 0.08 | 0.16 | 1.10 | 2.25 | 0.9 | 0.34 | 0.015 | 0.022 | | |
| 19 | W19 | III | A | 210 | 0.07 | 0.16 | 1.17 | 2.41 | 1.0 | 0.34 | 0.013 | 0.006 | | |
| 20 | W20 | II | A | 210 | 0.07 | 0.18 | 1.14 | 2.43 | 0.9 | 0.34 | 0.015 | 0.006 | | |
| 21 | W21 | IV | A | 210 | 0.09 | 0.17 | 0.98 | 2.05 | 1.0 | 0.32 | 0.014 | 0.006 | | |
| 22 | W22 | III | A | 210 | 0.08 | 0.15 | 1.08 | 2.36 | 1.0 | 0.36 | 0.012 | 0.006 | | |
| 23 | W23 | III | B | 210 | 0.11 | 0.15 | 1.04 | 2.00 | 1.0 | 0.33 | 0.012 | 0.005 | | |
| 24 | W24 | III | B | 210 | 0.12 | 0.15 | 1.08 | 2.04 | 1.0 | 0.33 | 0.014 | 0.006 | | |

| Specimen No. | Welding wire No. | Chemical composition of weld metal ** (% by mass) | | | | | | | Value |
|---|---|---|---|---|---|---|---|---|---|
| | | O | Cu | Ni | Al | W | Ti | B | A |
| 1 | W1 | 0.028 | <0.02 | <0.02 | <0.01 | <0.01 | <0.002 | <0.001 | 217 |
| 2 | W2 | 0.029 | <0.02 | <0.02 | <0.01 | <0.01 | <0.002 | <0.001 | 220 |
| 3 | W3 | 0.033 | <0.02 | <0.02 | <0.01 | 0.09 | <0.002 | <0.001 | 222 |
| 4 | W4 | 0.040 | 0.10 | <0.02 | <0.01 | <0.01 | <0.002 | <0.001 | 212 |
| 5 | W5 | 0.030 | 0.10 | <0.02 | <0.01 | <0.01 | <0.002 | <0.001 | 205 |
| 6 | W6 | 0.025 | 0.10 | <0.02 | <0.01 | <0.01 | <0.002 | <0.001 | 203 |
| 7 | W7 | 0.031 | 0.10 | <0.02 | <0.01 | 0.47 | <0.002 | <0.001 | 215 |
| 8 | W8 | 0.024 | 0.10 | <0.02 | <0.01 | <0.01 | <0.002 | <0.001 | 216 |
| 9 | W9 | 0.033 | 0.10 | <0.02 | <0.01 | <0.01 | <0.002 | <0.001 | 232 |
| 10 | W10 | 0.031 | 0.10 | <0.02 | <0.01 | <0.01 | <0.002 | <0.001 | 224 |
| 11 | W11 | 0.030 | 0.10 | <0.02 | <0.01 | <0.01 | <0.002 | <0.001 | 202 |
| 12 | W12 | 0.031 | 0.10 | <0.02 | <0.01 | <0.01 | <0.002 | <0.001 | 201 |
| 13 | W13 | 0.037 | 0.10 | <0.02 | <0.01 | <0.01 | <0.002 | <0.001 | 208 |
| 14 | W14 | 0.030 | 0.05 | <0.02 | <0.01 | 0.16 | <0.002 | 0.0006 | 212 |
| 15 | W15 | 0.028 | 0.10 | <0.02 | <0.01 | <0.01 | <0.002 | 0.0011 | 205 |
| 16 | W16 | 0.043 | 0.10 | <0.02 | <0.01 | <0.01 | <0.002 | 0.0008 | 214 |

TABLE 3-continued

| | | | | | | | |
|---|---|---|---|---|---|---|---|
| 17 | W17 | 0.039 | 0.10 | <0.02 | 0.05 | <0.01 | <0.002 | <0.001 | 201 |
| 18 | W18 | 0.033 | 0.14 | <0.02 | <0.01 | <0.01 | <0.002 | <0.001 | 223 |
| 19 | W19 | 0.051 | 0.10 | <0.02 | <0.01 | <0.01 | <0.002 | <0.001 | 204 |
| 20 | W20 | 0.034 | 0.10 | <0.02 | 0.24 | <0.01 | <0.002 | <0.001 | 212 |
| 21 | W21 | 0.027 | 0.10 | 0.18 | <0.01 | <0.01 | 0.017 | <0.001 | 221 |
| 22 | W22 | 0.036 | 0.10 | <0.02 | <0.01 | <0.01 | <0.002 | <0.001 | 202 |
| 23 | W23 | 0.03 | 0.24 | <0.02 | <0.01 | <0.01 | <0.002 | <0.001 | 222 |
| 24 | W24 | 0.032 | 0.48 | <0.02 | <0.01 | <0.01 | <0.002 | <0.001 | 221 |

** Remainder: iron and inevitable impurities

TABLE 4

| Specimen No. | Welding wire No. | Heat input conditions | Flux for use | Preheating/interpass temperature (°C.) | Chemical composition of weld metal ** (% by mass) | | | | | | | | | |
|---|---|---|---|---|---|---|---|---|---|---|---|---|---|---|
| | | | | | C | Si | Mn | Cr | Mo | V | Nb | N | | |
| 25 | W25 | III | A | 210 | 0.09 | 0.14 | 1.05 | 2.24 | 1.0 | 0.35 | 0.014 | 0.006 | | |
| 26 | W26 | III | A | 200 | 0.08 | 0.16 | 1.18 | 2.22 | 1.0 | 0.34 | 0.014 | 0.006 | | |
| 27 | W27 | III | A | 250 | 0.08 | 0.17 | 1.19 | 2.25 | 1.0 | 0.37 | 0.013 | 0.006 | | |
| 28 | W28 | III | B | 210 | 0.11 | 0.15 | 1.07 | 2.05 | 1.0 | 0.34 | 0.014 | 0.006 | | |
| 29 | W29 | III | B | 210 | 0.11 | 0.14 | 1.05 | 2.00 | 1.0 | 0.33 | 0.015 | 0.006 | | |
| 30 | W30 | III | A | 210 | 0.14 | 0.15 | 0.85 | 2.05 | 1.1 | 0.41 | 0.013 | 0.006 | | |
| 31 | W31 | I | A | 210 | 0.08 | 0.21 | 1.18 | 2.41 | 1.0 | 0.35 | 0.016 | 0.006 | | |
| 32 | W32 | V | A | 210 | 0.07 | 0.19 | 1.06 | 2.41 | 1.0 | 0.35 | 0.017 | 0.006 | | |
| 33 | W33 | III | A | 210 | 0.22 | 0.16 | 1.09 | 2.38 | 1.0 | 0.35 | 0.014 | 0.006 | | |
| 34 | W34 | III | A | 180 | 0.08 | 0.16 | 1.09 | 3.05 | 0.8 | 0.27 | 0.018 | 0.005 | | |
| 35 | W35 | III | A | 260 | 0.04 | 0.20 | 1.19 | 2.51 | 1.0 | 0.35 | 0.015 | 0.006 | | |
| 36 | W36 | III | A | 190 | 0.11 | 0.16 | 1.00 | 2.38 | 1.0 | 0.32 | 0.017 | 0.006 | | |
| 37 | W37 | III | B | 200 | 0.11 | 0.08 | 1.13 | 1.98 | 1.6 | 0.34 | 0.013 | 0.006 | | |
| 38 | W38 | III | A | 210 | 0.11 | 0.17 | 0.58 | 1.72 | 1.0 | 0.33 | 0.012 | 0.006 | | |
| 39 | W39 | III | B | 220 | 0.12 | 0.52 | 1.01 | 2.45 | 1.0 | 0.34 | 0.008 | 0.006 | | |
| 40 | W40 | III | B | 200 | 0.11 | 0.14 | 1.38 | 2.05 | 1.0 | 0.34 | 0.013 | 0.006 | | |
| 41 | W41 | III | B | 200 | 0.06 | 0.15 | 0.95 | 2.05 | 0.7 | 0.33 | 0.014 | 0.006 | | |
| 42 | W42 | III | A | 210 | 0.1 | 0.18 | 1.05 | 2.19 | 1.0 | 0.24 | 0.016 | 0.006 | | |
| 43 | W43 | III | A | 210 | 0.11 | 0.18 | 1.06 | 2.21 | 1.0 | 0.53 | 0.014 | 0.006 | | |
| 44 | W44 | III | B | 210 | 0.1 | 0.16 | 1.09 | 2.10 | 1.0 | 0.34 | 0.052 | 0.006 | | |
| 45 | W45 | III | A | 210 | 0.07 | 0.17 | 1.08 | 2.05 | 1.0 | 0.34 | 0.015 | 0.026 | | |
| 46 | W46 | III | B | 210 | 0.11 | 0.16 | 1.05 | 2.09 | 1.0 | 0.33 | 0.014 | 0.006 | | |
| 47 | W47 | III | B | 220 | 0.11 | 0.15 | 1.05 | 2.00 | 1.0 | 0.34 | 0.015 | 0.006 | | |

| Specimen No. | Welding wire No. | Chemical composition of weld metal ** (% by mass) | | | | | | | | Value A |
|---|---|---|---|---|---|---|---|---|---|---|
| | | O | Cu | Ni | W | Al | Ti | B | | |
| 25 | W25 | 0.037 | 0.10 | 0.43 | <0.01 | <0.01 | <0.002 | <0.001 | | 208 |
| 26 | W26 | 0.027 | 0.10 | <0.02 | <0.01 | 0.01 | <0.002 | 0.0018 | | 210 |
| 27 | W27 | 0.022 | 0.10 | <0.02 | <0.01 | 0.025 | <0.002 | <0.001 | | 208 |
| 28 | W28 | 0.03 | 0.10 | <0.02 | <0.01 | <0.01 | <0.002 | 0.0022 | | 220 |
| 29 | W29 | 0.028 | 0.10 | <0.02 | <0.01 | <0.01 | <0.002 | 0.0041 | | 223 |
| 30 | W30 | 0.032 | 0.10 | <0.02 | <0.01 | <0.01 | <0.002 | <0.001 | | 208 |
| 31 | W31 | 0.037 | 0.10 | <0.02 | <0.01 | <0.01 | <0.002 | <0.001 | | 203 |
| 32 | W32 | 0.032 | 0.10 | <0.02 | <0.01 | <0.01 | <0.002 | <0.001 | | 203 |
| 33 | W33 | 0.038 | 0.10 | <0.02 | <0.01 | <0.01 | <0.002 | <0.001 | | 203 |
| 34 | W34 | 0.031 | 0.10 | <0.02 | 0.15 | <0.01 | <0.002 | <0.001 | | 201 |
| 35 | W35 | 0.035 | 0.10 | <0.02 | <0.01 | <0.01 | <0.002 | <0.001 | | 198 |
| 36 | W36 | 0.045 | 0.10 | <0.02 | 0.18 | <0.01 | <0.002 | <0.001 | | 207 |
| 37 | W37 | 0.029 | 0.11 | <0.02 | <0.01 | <0.01 | <0.002 | <0.001 | | 167 |
| 38 | W38 | 0.032 | 0.10 | <0.02 | <0.01 | <0.01 | <0.002 | <0.001 | | 237 |
| 39 | W39 | 0.019 | 0.10 | <0.02 | <0.01 | <0.01 | <0.002 | <0.001 | | 201 |
| 40 | W40 | 0.025 | 0.10 | <0.02 | 0.53 | <0.01 | <0.002 | <0.001 | | 220 |
| 41 | W41 | 0.062 | <0.02 | <0.02 | <0.01 | <0.01 | <0.002 | <0.001 | | 264 |

TABLE 4-continued

| | | | | | | | |
|---|---|---|---|---|---|---|---|
| 42 | W42 | 0.03 | 0.10 | <0.02 | <0.01 | <0.002 | <0.001 | 214 |
| 43 | W43 | 0.03 | 0.10 | <0.02 | <0.01 | <0.002 | <0.001 | 209 |
| 44 | W44 | 0.028 | 0.10 | <0.02 | <0.01 | <0.002 | <0.001 | 231 |
| 45 | W45 | 0.034 | 0.10 | <0.02 | <0.01 | 0.021 | <0.001 | 219 |
| 46 | W46 | 0.031 | 0.56 | <0.02 | <0.01 | <0.002 | 0.0055 | 219 |
| 47 | W47 | 0.024 | 0.10 | 0.58 | 0.033 | <0.002 | <0.001 | 223 |

** Remainder: iron and inevitable impurities

TABLE 5

| Specimen No. | Average equivalent—circle diameter of carbide particles (μm) | Ratio of carbide particles in grain boundary (%) | Tensile strength TS (MPa) | $vE_{-30}$ (J) | SR cracking resistance | Rupture time (hr) |
|---|---|---|---|---|---|---|
| 1 | 0.60 | 38 | 421 | 78 | ○ | 1420 |
| 2 | 0.64 | 44 | 436 | 71 | ○ | 1738 |
| 3 | 0.75 | 52 | 427 | 67.5 | ○ | 2011 |
| 4 | 0.60 | 47 | 430 | 98 | ○ | 1824 |
| 5 | 0.59 | 27 | 411 | 141 | ○ | 1053 |
| 6 | 0.82 | 61 | 451 | 68 | ○ | 2119 |
| 7 | 0.79 | 56 | 423 | 71 | ○ | 2121 |
| 8 | 0.58 | 36 | 461 | 62 | ○ | 1473 |
| 9 | 0.59 | 28 | 456 | 123 | ○ | 1120 |
| 10 | 0.61 | 48 | 415 | 62 | ○ | 1896 |
| 11 | 0.83 | 29 | 411 | 58 | ○ | 1016 |
| 12 | 0.81 | 35 | 453 | 62 | ○ | 1288 |
| 13 | 0.62 | 33 | 469 | 80 | ○ | 1191 |
| 14 | 0.58 | 44 | 431 | 110 | ○ | 1638 |
| 15 | 0.70 | 59 | 429 | 151 | ○ | 1542 |
| 16 | 0.56 | 38 | 448 | 57 | ○ | 1539 |
| 17 | 0.66 | 41 | 412 | 98 | ○ | 1220 |
| 18 | 0.60 | 29 | 429 | 67 | ○ | 1143 |
| 19 | 0.60 | 45 | 416 | 88 | ○ | 1510 |
| 20 | 0.66 | 29 | 421 | 78 | ○ | 1043 |
| 21 | 0.59 | 43 | 447 | 56 | ○ | 1767 |
| 22 | 0.56 | 47 | 419 | 132 | ○ | 1652 |
| 23 | 0.60 | 41 | 436 | 100 | ○ | 1655 |
| 24 | 0.58 | 34 | 438 | 125 | ○ | 1156 |

TABLE 6

| Specimen No. | Average equivalent—circle diameter of carbide particles (μm) | Ratio of carbide particles in grain boundary (%) | Tensile strength TS (MPa) | $vE_{-30}$ (J) | SR cracking resistance | Rupture time (hr) |
|---|---|---|---|---|---|---|
| 25 | 0.59 | 30 | 419 | 146 | ○ | 1032 |
| 26 | 0.63 | 38 | 428 | 85 | ○ | 1337 |
| 27 | 0.66 | 35 | 437 | 60 | ○ | 1317 |
| 28 | 0.60 | 42 | 424 | 79 | ○ | 1635 |
| 29 | 0.58 | 45 | 439 | 65 | ○ | 1849 |
| 30 | 0.78 | 55 | 440 | 88 | ○ | 2087 |
| 31 | 0.56 | 23 | 413 | 120 | ○ | 800 |
| 32 | 0.93 | 44 | 410 | 51 | ○ | 1438 |
| 33 | 0.88 | 21 | 461 | 31 | ○ | 819 |
| 34 | 1.02 | 21 | 411 | 50 | ○ | 733 |
| 35 | 0.71 | 28 | 418 | 103 | ○ | 957 |
| 36 | 0.56 | 20 | 391 | 166 | ○ | 681 |
| 37 | 0.87 | 24 | 488 | 42 | ○ | 807 |
| 38 | 0.56 | 23 | 462 | 140 | x | 888 |
| 39 | 0.58 | 23 | 396 | 31 | ○ | 723 |
| 40 | 1.06 | 56 | 391 | 26 | ○ | 1997 |
| 41 | 0.51 | 23 | 388 | 13 | ○ | 924 |
| 42 | 0.65 | 51 | 395 | 126 | ○ | 988 |
| 43 | 0.56 | 31 | 489 | 46 | ○ | 1319 |
| 44 | 0.54 | 28 | 491 | 41 | x | 1106 |
| 45 | 0.50 | 35 | 465 | 48 | x | 656 |
| 46 | 0.56 | 24 | 441 | 138 | x | 988 |
| 47 | 0.55 | 23 | 445 | 52 | ○ | 954 |

The following consideration can be made from Tables 1 to 6 (each number No. described below illustrates a specimen No. in Tables 3 to 6). The specimens No. 1 to 30 are examples that satisfy the requirements defined by the invention, and thus can provide weld metals exhibiting excellent creep-rupture resistance as well as the excellent other characteristics, including toughness, SR cracking resistance, and strength.

In contrast, the specimens No. 31 to 47 are examples that do not satisfy any one of the requirements defined by the invention, and which are inferior in any one of the characteristics. Among them, the specimen No. 31 has a small ratio of carbide particles in the grain boundaries due to the heat input conditions (with the amount of heat input of 2.4 kJ/mm), and thus is inferior in the creep-rupture resistance (because the rupture time was 800 hours). In the specimen No. 32, the average equivalent-circle diameter of carbide particles each having an equivalent-circle diameter of 0.40 μm or more and contained in the weld metal exceeds the predetermined range due to the heat input conditions (with the amount of heat input of 5.2 kJ/m). The specimen No. 32 is determined to be inferior in toughness (with $vE_{-30}$ of 51J).

In the specimen No. 33, the preheating/interpass temperature is lower than an appropriate range, the Cr content is excessive, the average equivalent-circle diameter of the carbide particles becomes large, and the ratio of carbide particles in the grain boundaries becomes smaller, which degrades the toughness and creep-rupture characteristics of the weld metal. In the specimen No. 34, the preheating/interpass temperature is higher than the appropriate range, the Cr content is excessive, the average equivalent-circle diameter of the carbide particles becomes large, and the ratio of carbide particles in the grain boundaries becomes smaller, which degrades the toughness and creep-rupture resistance of the weld metal.

In the specimen No. 35, the value A defined by the compositions of the weld metal is less than 200, which degrades the creep-rupture resistance of the weld metal. In the specimen No. 36, the C content is lacking, the ratio of the carbide particles in the grain boundaries becomes smaller, which reduces the strength of the weld metal and degrades the creep-rupture resistance thereof.

In the specimen No. 37, the Si content is lacking, the Mo content is excessive, the value A is less than 200, the average equivalent-circle diameter of the carbide particles becomes large, and the ratio of carbide particles in the grain boundaries becomes smaller, which degrades the toughness and creep-rupture characteristics of the weld metal. In the specimen No. 38, the ratio ([Mn]/[Cr]) of the welding wire is low (0.35), the content Mn and content Cr of the weld metal are lacking, and the ratio of the carbide particles in the grain boundaries becomes smaller, which degrades the SR cracking resistance and creep-rupture resistance of the weld metal.

In the specimen No. 39, the Si content is excessive, the Nb content is lacking, and the ratio of carbide particles in the grain boundaries is small, which reduces the strength and degrades the toughness and creep-rupture resistance of the weld metal. In the specimen No. 40, the Mn content and W content of the weld metal are excessive, and the average equivalent-circle diameter of the carbide particles becomes large, which degrades the toughness of the weld metal.

In the specimen No. 41, the Mo content is lacking, the O content is excessive, and the ratio of the carbide particles in the grain boundaries is small, which reduces the strength of the weld metal and degrades the toughness and creep-rupture resistance thereof. In the specimen No. 42, the V content of the weld metal is lacking, which reduces the strength of the weld metal and degrades the creep-rupture resistance thereof. In the specimen No. 43, the V content of the weld metal is excessive, which degrades the toughness of the weld metal.

In the specimen No. 44, the Nb content of the weld metal is excessive, which degrades the toughness and SR cracking resistance of the weld metal. In the specimen No. 45, the N content and the Ti content of the weld metal are excessive, which degrades the toughness, SR cracking resistance, and creep-rupture resistance of the weld metal.

In the specimen No. 46, the Cu content and the B content of the weld metal are excessive, and the ratio of the carbide particles in the grain boundaries is small, which degrades the SR cracking resistance and creep-rupture resistance of the weld metal. In the specimen No. 47, the Ni content and the Al content of the weld metal are excessive, and the ratio of the carbide particles in the grain boundaries is small, which degrades the toughness and creep-rupture resistance of the weld metal.

Example 2

The chemical compositions of various coating agents used in forming the weld metals by the SMAW are shown in the following Table 7 together with (S+SiO$_2$ amount) and the ([Mn]/[Cr]) ratio (see coating agents No B1 to 20). The chemical compositions of weld metals formed are shown in the following Table 8 together with welding conditions (coating agent number No., heat input conditions, core wire type, and preheating/interpass temperature) and the value A. Further, the results of evaluation of characteristics of the respective weld metals (average equivalent-circle diameter of carbide particles, the ratio of the carbide particles in the grain boundaries, tensile strength TS, toughness (vE$_{-30}$), SR cracking resistance, and creep-rupture resistance) are shown in the following Table 9.

TABLE 7

| Coating agent No. | Chemical composition of coating agent (% by mass) | | | | | | | | | | |
|---|---|---|---|---|---|---|---|---|---|---|---|
| | CaO | CO$_2$ | CaF$_2$ | BaO | C | Si | SiO$_2$ | Mn | Cr | Mo | V |
| B1 | 23 | 22 | 21 | 4 | 0.080 | 3.4 | 2.9 | 2.6 | 0.8 | — | 1.0 |
| B2 | 23 | 22 | 21 | 4 | 0.085 | 3.4 | 2.9 | 2.6 | 0.8 | — | 1.0 |
| B3 | 23 | 22 | 21 | 4 | 0.085 | 3.4 | 2.9 | 2.6 | 0.8 | 0.01 | 1.0 |
| B4 | 23 | 22 | 21 | 4 | 0.090 | 3.4 | 2.9 | 2.6 | 0.8 | — | 1.7 |
| B5 | 23 | 22 | 21 | 4 | 0.090 | 2.3 | 2.9 | 2.6 | 0.8 | — | 1.5 |
| B6 | 23 | 22 | 21 | 4 | 0.085 | 3.4 | 2.9 | 2.6 | 0.8 | — | 1.5 |
| B7 | 23 | 22 | 21 | 4 | 0.085 | 3.4 | 2.9 | 2.6 | 0.8 | — | 1.6 |
| B8 | 23 | 22 | 21 | 4 | 0.075 | 3.4 | 2.9 | 2.6 | 0.2 | — | 1.0 |
| B9 | 23 | 22 | 21 | 4 | 0.152 | 3.4 | 2.9 | 2.1 | 0.8 | — | 1.0 |
| B10 | 23 | 22 | 21 | 4 | 0.276 | 3.4 | 2.9 | 3.0 | 0.8 | — | 1.0 |
| B11 | 22 | 21 | 20 | 4 | 0.125 | 3.3 | 2.7 | 2.8 | 2.3 | 1.56 | 1.0 |
| B12 | 23 | 22 | 21 | 4 | 0.152 | 3.4 | 2.9 | 2.6 | 0.8 | 0.01 | 1.0 |
| B13 | 23 | 22 | 21 | 4 | 0.650 | 3.6 | 2.9 | 2.6 | 0.8 | — | 1.4 |
| B14 | 23 | 22 | 21 | 4 | 0.130 | 3.6 | 2.8 | 2.6 | 0.8 | — | 1.4 |
| B15 | 22 | 21 | 20 | 4 | 0.128 | 3.3 | 2.7 | 2.5 | 2.2 | 1.33 | 0.9 |
| B16 | 23 | 22 | 21 | 4 | 0.084 | 3.4 | 2.9 | 2.6 | 1.6 | — | 1.0 |
| B17 | 23 | 22 | 21 | 4 | 0.051 | 3.3 | 2.8 | 2.6 | 1.7 | — | 1.5 |
| B18 | 24 | 22 | 21 | 5 | 0.097 | 3.4 | 2.9 | 1.0 | 0.8 | — | 1.0 |
| B19 | 23 | 22 | 21 | 4 | 0.065 | 3.0 | 2.9 | 4.4 | 0.8 | — | 1.0 |
| B20 | 22 | 21 | 20 | 4 | 0.127 | 3.3 | 2.7 | 2.5 | 2.0 | 1.67 | 0.9 |

| Coating agent No. | Chemical composition of coating agent (% by mass) | | | | | | | | |
|---|---|---|---|---|---|---|---|---|---|
| | Nb | W | Al | Al$_2$O$_3$ | Ti | B | Others* | Si + SiO$_2$ | [Mn]/[Cr] |
| B1 | 0.11 | — | 0.09 | 0.5 | 0.004 | 0.06 | 18 | 6.3 | 3.4 |
| B2 | 0.11 | — | 0.09 | 0.5 | 0.004 | 0.06 | 18 | 6.3 | 3.4 |
| B3 | 0.11 | 0.3 | 0.09 | 0.5 | 0.004 | 0.06 | 18 | 6.2 | 3.4 |
| B4 | 0.11 | — | 0.10 | 0.5 | 0.004 | 0.06 | 18 | 6.2 | 3.4 |

TABLE 7-continued

| | | | | | | | | | |
|---|---|---|---|---|---|---|---|---|---|
| B5  | 0.20 | —   | 0.10 | 0.5 | 0.004 | 0.06 | 19 | 5.1 | 3.4  |
| B6  | 0.11 | —   | 0.10 | 0.5 | 0.004 | 0.06 | 18 | 6.2 | 3.4  |
| B7  | 0.35 | 0.6 | 0.10 | 0.5 | 0.004 | 0.08 | 17 | 6.2 | 3.4  |
| B8  | 0.11 | —   | 0.09 | 0.5 | 0.004 | 0.06 | 18 | 6.3 | 13.2 |
| B9  | 0.11 | —   | 0.09 | 0.5 | 0.004 | 0.06 | 18 | 6.3 | 2.7  |
| B10 | 0.11 | —   | 0.09 | 0.5 | 0.004 | 0.06 | 17 | 6.3 | 3.8  |
| B11 | 0.11 | —   | 0.09 | 0.5 | 0.004 | 0.06 | 18 | 6.0 | 1.2  |
| B12 | 0.11 | 0.3 | 0.09 | 0.5 | 0.004 | 0.06 | 18 | 6.2 | 3.4  |
| B13 | 0.20 | —   | 0.10 | 0.5 | 0.005 | 0.06 | 17 | 6.4 | 3.4  |
| B14 | 0.16 | —   | 0.10 | 0.5 | 0.005 | 0.06 | 18 | 6.4 | 3.4  |
| B15 | 0.11 | —   | 0.08 | 0.5 | 0.004 | 0.06 | 18 | 6.1 | 1.1  |
| B16 | 0.11 | —   | 0.09 | 0.5 | 0.004 | 0.06 | 17 | 6.2 | 1.6  |
| B17 | 0.11 | —   | 0.10 | 0.5 | 0.004 | 0.06 | 18 | 6.2 | 1.6  |
| B18 | 0.12 | —   | 0.09 | 0.5 | 0.005 | 0.06 | 18 | 6.6 | 1.3  |
| B19 | 0.11 | —   | 0.08 | 0.5 | 0.004 | —    | 16 | 5.9 | 5.6  |
| B20 | 0.11 | —   | 0.08 | 0.5 | 0.004 | 0.06 | 19 | 6.1 | 1.3  |

*Others: SrO, $BaF_2$, and the like

TABLE 8

| Specimen No. | Coating agent No. | Heat input conditions | Core wire type | Preheating/ interpass temperature (° C.) | Chemical composition of weld metal ** (% by mass) | | | | | | | | | | |
|---|---|---|---|---|---|---|---|---|---|---|---|---|---|---|---|
| | | | | | C | Si | Mn | Cr | Mo | V | Nb | N | | | |
| 48 | B1 | VII | a | 200 | 0.07 | 0.29 | 0.92 | 2.35 | 1.0 | 0.28 | 0.018 | 0.013 | | | |
| 49 | B2 | VII | a | 200 | 0.09 | 0.28 | 0.94 | 2.37 | 1.0 | 0.28 | 0.019 | 0.013 | | | |
| 50 | B3 | VII | a | 200 | 0.09 | 0.28 | 0.93 | 2.36 | 1.0 | 0.27 | 0.019 | 0.014 | | | |
| 51 | B4 | VII | a | 200 | 0.07 | 0.27 | 0.91 | 2.34 | 1.0 | 0.46 | 0.016 | 0.013 | | | |
| 52 | B5 | IX | a | 200 | 0.08 | 0.14 | 0.90 | 2.34 | 1.0 | 0.42 | 0.029 | 0.013 | | | |
| 53 | B6 | VII | a | 190 | 0.09 | 0.28 | 0.91 | 2.35 | 1.0 | 0.41 | 0.018 | 0.016 | | | |
| 54 | B7 | VII | a | 210 | 0.06 | 0.29 | 0.89 | 2.34 | 1.0 | 0.43 | 0.042 | 0.014 | | | |
| 55 | B8 | VIII | a | 210 | 0.10 | 0.26 | 0.93 | 2.02 | 1.0 | 0.28 | 0.018 | 0.017 | | | |
| 56 | B9 | VIII | a | 210 | 0.12 | 0.30 | 0.65 | 2.39 | 1.0 | 0.29 | 0.020 | 0.012 | | | |
| 57 | B10 | VIII | a | 250 | 0.08 | 0.29 | 1.24 | 2.38 | 1.0 | 0.29 | 0.020 | 0.015 | | | |
| 58 | B11 | VIII | b | 220 | 0.10 | 0.27 | 1.16 | 1.88 | 1.2 | 0.26 | 0.017 | 0.016 | | | |
| 59 | B12 | VIII | a | 220 | 0.18 | 0.28 | 0.93 | 2.39 | 1.0 | 0.28 | 0.018 | 0.013 | | | |
| 60 | B13 | VIII | a | 220 | 0.10 | 0.32 | 0.95 | 2.38 | 1.0 | 0.40 | 0.032 | 0.015 | | | |
| 61 | B14 | VII | a | 200 | 0.08 | 0.31 | 0.95 | 2.38 | 1.1 | 0.41 | 0.026 | 0.017 | | | |
| 62 | B1 | VIII | a | 180 | 0.07 | 0.28 | 0.93 | 2.31 | 1.0 | 0.29 | 0.017 | 0.014 | | | |
| 63 | B1 | VIII | a | 260 | 0.09 | 0.27 | 0.92 | 2.32 | 1.0 | 0.28 | 0.016 | 0.015 | | | |
| 64 | B1 | VI | a | 210 | 0.08 | 0.28 | 0.94 | 2.33 | 1.1 | 0.28 | 0.017 | 0.014 | | | |
| 65 | B1 | X | a | 210 | 0.08 | 0.28 | 0.91 | 2.34 | 1.0 | 0.28 | 0.016 | 0.014 | | | |
| 66 | B15 | VIII | b | 220 | 0.08 | 0.28 | 0.93 | 1.81 | 1.0 | 0.25 | 0.016 | 0.015 | | | |
| 67 | B16 | VII | a | 210 | 0.07 | 0.28 | 0.92 | 2.66 | 1.0 | 0.27 | 0.018 | 0.013 | | | |
| 68 | B17 | VIII | a | 210 | 0.04 | 0.30 | 0.92 | 2.66 | 1.0 | 0.28 | 0.019 | 0.014 | | | |
| 69 | B18 | VIII | a | 200 | 0.07 | 0.38 | 0.55 | 2.40 | 1.0 | 0.31 | 0.022 | 0.015 | | | |
| 70 | B19 | VIII | a | 200 | 0.07 | 0.19 | 1.36 | 2.38 | 1.0 | 0.23 | 0.016 | 0.011 | | | |
| 71 | B20 | VIII | b | 220 | 0.08 | 0.29 | 0.93 | 1.65 | 1.1 | 0.24 | 0.016 | 0.014 | | | |

| Specimen No. | Chemical composition of weld metal ** (% by mass) | | | | | | | | |
|---|---|---|---|---|---|---|---|---|---|
| | O | Cu | Ni | W | Al | Ti | B | Value A | |
| 48 | 0.034 | 0.03 | 0.03 | <0.01 | <0.01 | <0.002 | 0.0011 | 208 | |
| 49 | 0.032 | 0.03 | 0.03 | <0.01 | <0.01 | <0.002 | 0.0013 | 208 | |
| 50 | 0.033 | 0.03 | 0.03 | 0.09 | <0.01 | <0.002 | 0.0013 | 208 | |
| 51 | 0.036 | 0.04 | 0.03 | <0.01 | <0.01 | <0.002 | 0.0013 | 205 | |
| 52 | 0.031 | 0.04 | 0.03 | <0.01 | <0.01 | <0.002 | 0.0013 | 210 | |
| 53 | 0.033 | 0.04 | 0.03 | <0.01 | <0.01 | <0.002 | 0.0013 | 207 | |
| 54 | 0.038 | 0.04 | 0.03 | 0.21 | <0.01 | <0.002 | 0.002 | 213 | |
| 55 | 0.031 | 0.03 | 0.03 | <0.01 | <0.01 | <0.002 | 0.0013 | 223 | |
| 56 | 0.032 | 0.03 | 0.03 | <0.01 | <0.01 | <0.002 | 0.0015 | 207 | |
| 57 | 0.033 | 0.02 | 0.03 | <0.01 | <0.01 | <0.002 | 0.0013 | 207 | |
| 58 | 0.032 | 0.03 | 0.03 | 0.09 | <0.01 | <0.002 | 0.0014 | 208 | |
| 59 | 0.032 | 0.03 | 0.03 | <0.01 | 0.022 | <0.002 | 0.0014 | 208 | |
| 60 | 0.024 | 0.03 | 0.03 | <0.01 | <0.01 | <0.002 | 0.0014 | 206 | |
| 61 | 0.034 | 0.03 | 0.03 | <0.01 | <0.01 | <0.002 | 0.0015 | 203 | |
| 62 | 0.033 | 0.03 | 0.03 | <0.01 | <0.01 | <0.002 | 0.0012 | 208 | |
| 63 | 0.032 | 0.03 | 0.03 | <0.01 | <0.01 | <0.002 | 0.0011 | 205 | |

TABLE 8-continued

| | | | | | | | |
|---|---|---|---|---|---|---|---|
| 64 | B1 | 0.033 | 0.03 | 0.03 | <0.01 | <0.002 | 0.0011 | 203 |
| 65 | B1 | 0.031 | 0.03 | 0.03 | <0.01 | <0.002 | 0.0012 | 205 |
| 66 | B15 | 0.032 | 0.02 | 0.03 | <0.01 | <0.002 | 0.0015 | 233 |
| 67 | B16 | 0.035 | 0.03 | 0.03 | <0.01 | <0.002 | 0.0013 | 197 |
| 68 | B17 | 0.032 | 0.03 | 0.03 | <0.01 | <0.002 | 0.0014 | 197 |
| 69 | B18 | 0.034 | 0.03 | 0.03 | <0.01 | <0.002 | 0.0016 | 208 |
| 70 | B19 | 0.041 | 0.03 | 0.03 | <0.01 | <0.002 | <0.001 | 209 |
| 71 | B20 | 0.033 | 0.02 | 0.03 | <0.01 | <0.002 | 0.0014 | 228 |

** Remainder: iron and inevitable impurities

TABLE 9

| Specimen No. | Average equivalent—circle diameter of carbide particles (μm) | Ratio of carbide particles in grain boundary (%) | Tensile strength TS (MPa) | $vE_{-30}$ (J) | SR cracking resistance | Rupture time (hr) |
|---|---|---|---|---|---|---|
| 48 | 0.68 | 41 | 420 | 148 | ○ | 1385 |
| 49 | 0.72 | 43 | 428 | 108 | ○ | 1423 |
| 50 | 0.71 | 48 | 427 | 144 | ○ | 1681 |
| 51 | 0.59 | 28 | 478 | 160 | ○ | 1703 |
| 52 | 0.62 | 46 | 464 | 138 | ○ | 1970 |
| 53 | 0.63 | 27 | 452 | 155 | ○ | 1353 |
| 54 | 0.58 | 28 | 471 | 118 | ○ | 1673 |
| 55 | 0.54 | 28 | 412 | 135 | ○ | 1053 |
| 56 | 0.56 | 37 | 442 | 145 | ○ | 1146 |
| 57 | 0.82 | 59 | 425 | 89 | ○ | 1570 |
| 58 | 0.59 | 27 | 453 | 136 | ○ | 1042 |
| 59 | 0.70 | 54 | 421 | 142 | ○ | 1837 |
| 60 | 0.83 | 60 | 472 | 78 | ○ | 2021 |
| 61 | 0.62 | 42 | 433 | 130 | ○ | 1416 |
| 62 | 0.60 | 23 | 425 | 151 | ○ | 748 |
| 63 | 0.93 | 50 | 415 | 50 | ○ | 1575 |
| 64 | 0.58 | 22 | 433 | 155 | ○ | 817 |
| 65 | 0.91 | 51 | 409 | 48 | ○ | 1597 |
| 66 | 0.59 | 24 | 460 | 121 | ○ | 971 |
| 67 | 0.76 | 45 | 418 | 157 | ○ | 624 |
| 68 | 0.68 | 23 | 425 | 154 | ○ | 675 |
| 69 | 0.58 | 29 | 436 | 137 | x | 1145 |
| 70 | 0.83 | 63 | 383 | 136 | ○ | 1586 |
| 71 | 0.56 | 20 | 461 | 70 | ○ | 867 |

The following consideration can be made from Tables 7 to 9 (each No. described below illustrates a specimen No. in Tables 8 and 9). The specimens No. 48 to 61 are examples that satisfy the requirements defined by the invention, and thus can provide the weld metals exhibiting excellent creep-rupture resistance as well as the excellent other characteristics, including toughness, SR cracking resistance, and strength.

In contrast, the specimens No. 62 to 71 are examples that do not satisfy any one of the requirements defined by the invention, and which are inferior in any one of the characteristics. Among them, in the specimen No. 62, the preheating/interpass temperature is lower than an appropriate range, and the ratio of the carbide particles in the grain boundaries becomes small, which degrades the creep-rupture resistance of the weld metal. In the specimen No. 63, the preheating/interpass temperature is higher than the appropriate range, and the average equivalent-circle diameter of the carbide particles each having an equivalent-circle diameter of 0.4 μm or more and contained in the weld metal exceeds the predetermined range, which degrades the toughness of the weld metal.

In the specimen No. 64, the ratio of the carbide particles in the grain boundaries is small due to the heat input conditions (with the amount of heat input of 2.1 kJ/mm), which degrades the creep-rupture resistance (because the rupture time was 817 hours). In the specimen No. 65, the average equivalent-circle diameter of carbide particles each having an equivalent-circle diameter of 0.40 μm or more and contained in the weld metal exceeds the predetermined range due to the heat input conditions (the amount of heat input of 3.2 kJ/mm), which degrades the toughness of the weld metal (because $vE_{-30}$ was 48 J).

In the specimen No. 66, the ratio ([Mn]/[Cr]) in the coating agent is low, and the ratio of carbide particles in the grain boundaries becomes small, which degrades the creep-rupture resistance of the weld metal. In the specimen No. 67, the value A defined by the compositions of the weld metal is less than 200, which degrades the creep-rupture resistance of the weld metal.

In the specimen No. 68, the C content is lacking, the value A is less than 200, and the ratio of the carbide particles in the grain boundaries becomes smaller, which degrades the creep-rupture resistance of the weld metal. In the specimen No. 69, the Mn content is lacking, which degrades the SR cracking resistance of the weld metal.

In the specimen No. 70, the Mn content is excessive, and the V content is lacking, which degrades the strength of the weld metal. In the specimen No. 71, the Cr content and the V content are lacking, and the ratio of the carbide particles in the grain boundaries becomes smaller, which degrades the creep-rupture resistance of the weld metal.

The present invention has been described in detail above with reference the specific embodiments. It is apparent to those skilled in the art that various modifications and changes can be made to the disclosed embodiments without departing from the spirit and scope of the invention.

The disclosure of Japanese Patent Application No. 2011-026485 filed on Feb. 9, 2011 including the specification, drawings and abstract is incorporated herein by reference in its entirety.

Industrial Applicability

The weld metal according to the present invention has the improved creep characteristics, and thus is useful, for example, for a boiler and a chemical reactor.

What is claimed is:

1. A weld metal, consisting essentially of:
C in a content by mass of from 0.05 to 0.20%,
Si in a content by mass of from 0.10 to 0.50%,
Mn in a content by mass of from 0.60 to 1.3%,
Cr in a content by mass of from 1.8 to 3.0%,
Mo in a content by mass of from 0.8 to 1.5%,
V in a content by mass of from 0.25 to 0.50%,
Nb in a content by mass of from 0.010 to 0.050%,
N in a content by mass of greater than 0% and no more than 0.025%,
O in a content by mass of from 0.020 to 0.060%,
iron, and
inevitable impurities, wherein a value A defined by formula (I) is 200 or greater, the formula expressed as follow:

$$\text{Value } A = ([V]/51 + [Nb]/93) / \{[V] \times ([Cr]/5 + [Mo]/2)\} \times 10^4 \quad (1),$$

wherein [V], [Nb], [Cr], and [Mo] respectively indicate contents of V, Nb, Cr, and Mo by mass % in the weld metal, carbide particles each having an equivalent-circle diameter of 0.40 μm or more contained in the weld metal have an average equivalent-circle diameter of less than 0.85 μm, and in segments connecting centers of three or more carbide particles which are present on a 6-μm straight line and each of which has an equivalent-circle diameter of 0.4 μm or more, a sum of lengths of portions where the segments intersect the carbide particles is 25% or more of an overall length of the segments.

2. A weld structure, comprising the weld metal according to claim 1.

3. The weld metal according to claim 1, wherein the value A is 250 or less.

4. The weld metal according to claim 1, wherein the carbide particles each having the equivalent-circle diameter of 0.40 μm or more contained in the weld metal have an average equivalent-circle diameter of less than 0.7 μm.

5. The weld metal according to claim 1, wherein in segments connecting centers of three or more carbide particles which are present on the 6-μm straight line and each of which has the equivalent-circle diameter of 0.4 μm or more, a sum of lengths of portions where the segments intersect the carbide particles is 40% or more of the overall length of the segments.

* * * * *